United States Patent
Lee et al.

(10) Patent No.: US 10,941,262 B2
(45) Date of Patent: Mar. 9, 2021

(54) SELF-HUMIDIFYING ION-EXCHANGE COMPOSITE MEMBRANE AND METHOD FOR FABRICATING THE SAME

(71) Applicant: Industry-University Cooperation Foundation Hanyang University, Seoul (KR)

(72) Inventors: Young Moo Lee, Seoul (KR); Sang Hyun Park, Seoul (KR); Sun-ju Moon, Gumi-si (KR); Hyun Jin Park, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 123 days.

(21) Appl. No.: 16/303,198

(22) PCT Filed: May 23, 2017

(86) PCT No.: PCT/KR2017/005350
§ 371 (c)(1),
(2) Date: Nov. 20, 2018

(87) PCT Pub. No.: WO2017/204531
PCT Pub. Date: Nov. 30, 2017

(65) Prior Publication Data
US 2020/0102435 A1 Apr. 2, 2020

(30) Foreign Application Priority Data

May 24, 2016 (KR) .................. 10-2016-0063331
May 22, 2017 (KR) .................. 10-2017-0062875

(51) Int. Cl.
*C08J 5/22* (2006.01)
*C08J 7/16* (2006.01)
(Continued)

(52) U.S. Cl.
CPC ............ *C08J 5/2225* (2013.01); *C08J 7/16* (2013.01); *H01M 8/0239* (2013.01);
(Continued)

(58) Field of Classification Search
CPC ........ C08J 5/2225; C08J 7/16; C08J 2327/18; C08J 2367/03; C08J 2379/06; C08J 2381/06; H01M 8/0239; H01M 8/1044
(Continued)

(56) References Cited

U.S. PATENT DOCUMENTS

| 10,071,346 B2 * | 9/2018 | Lee ..................... B01D 67/0083 |
| 2012/0141913 A1 * | 6/2012 | Lee ..................... H01M 8/1032 429/492 |

(Continued)

FOREIGN PATENT DOCUMENTS

| KR | 10-1999-0003661 A | 1/1999 |
| KR | 10-0727216 B1 | 6/2007 |

(Continued)

OTHER PUBLICATIONS

Chi Hoon Park et al., "Nanocrack-regulated self-humidifying membranes", Nature, Apr. 28, 2016, pp. 480-483, vol. 532.
(Continued)

*Primary Examiner* — Michael Bernshteyn
(74) *Attorney, Agent, or Firm* — Sughrue Mion, PLLC

(57) ABSTRACT

The present invention relates to a self-humidifying ion-exchange composite membrane including an aromatic hydrocarbon polymer ion-exchange membrane formed on the surface of a porous polymer support and a thin hydrophobic coating layer having a nanocracked morphology pattern on the surface of the ion-exchange membrane. The self-humidifying ion-exchange composite membrane of the present invention has good thermal/chemical stability, high mechanical strength, high ion-exchange capacity, and good (Continued)

long-term operational stability. Particularly, the self-humidifying ion-exchange composite membrane of the present invention is able to self-hydrate even under high-temperature and low-humidity conditions. Due to these advantages, it is expected that the self-humidifying ion-exchange composite membrane of the present invention will be commercialized as an electrolyte membrane for a fuel cell or a membrane for water treatment.

12 Claims, 10 Drawing Sheets

(51) Int. Cl.
*H01M 8/10* (2016.01)
*H01M 8/02* (2016.01)
*H01M 8/0239* (2016.01)
*H01M 8/1044* (2016.01)

(52) U.S. Cl.
CPC ....... *H01M 8/1044* (2013.01); *C08J 2327/18* (2013.01); *C08J 2367/03* (2013.01); *C08J 2379/06* (2013.01); *C08J 2381/06* (2013.01)

(58) Field of Classification Search
USPC .......................................................... 521/25
See application file for complete search history.

(56) References Cited

U.S. PATENT DOCUMENTS

| | | | |
|---|---|---|---|
| 2013/0101918 A1 | 4/2013 | Yandrasits et al. | |
| 2014/0335439 A1* | 11/2014 | Lee ..................... | H01M 8/1086 429/492 |
| 2016/0214065 A1* | 7/2016 | Lee ........................ | C08G 73/22 |

FOREIGN PATENT DOCUMENTS

| | | | | |
|---|---|---|---|---|
| KR | 10-1063215 B1 | 9/2011 | | |
| KR | 10-1178644 B1 | 8/2012 | | |
| KR | 10-2012-0128905 A | * 11/2012 | .......... | H01M 8/1054 |
| KR | 10-1201491 B1 | 12/2012 | | |
| KR | 10-1315744 B1 | 10/2013 | | |
| KR | 10-1571393 B1 | 11/2015 | | |
| KR | 10-2016-0024137 A | * 3/2016 | ............. | H01M 8/10 |
| KR | 10-1860499 B1 | 5/2018 | | |

OTHER PUBLICATIONS

International Search Report of PCT/KR2017/005350 dated Aug. 28, 2017 [PCT/ISA/210].

* cited by examiner

Fuming and hot pressing
(130°C, 150kgf/cm²)

Thermal cross-linking
(180°C, 5hr)

Before cross-linking

After cross-linking a b

SELF-HUMIDIFYING ION-EXCHANGE COMPOSITE MEMBRANE AND METHOD FOR FABRICATING THE SAME

CROSS REFERENCE TO RELATED APPLICATIONS

This application is a National Stage of International Application No. PCT/KR2017/005350, filed May 23, 2017, claiming priorities based on Korean Patent Application Nos. 10-2016-0063331, filed May 24, 2016 and 10-2017-0062875, filed May 22, 2017.

TECHNICAL FIELD

The present invention relates to a self-humidifying ion-exchange composite membrane and a method for fabricating the same. More specifically, the present invention relates to the fabrication of a self-humidifying ion-exchange composite membrane including an aromatic hydrocarbon polymer ion-exchange membrane formed on a porous polymer support and a thin hydrophobic coating layer having a nanocracked morphology pattern on the surface of the ion-exchange membrane and the use of the composite membrane as an electrolyte membrane for a fuel cell, a membrane for water treatment or the like.

BACKGROUND ART

Generally, ion-exchange membranes are used in a wide range of applications for separations, energy conversion and energy storage systems, where selective barrier properties are essential for high performance in membrane-integrated systems. Membranes with selective transport surfaces, which have properties unlike those of the bulk material and have the potential to overcome the permeability and selectivity trade-off behavior that is observed in many applications. Particularly, the regulation of water content in ion-exchange membranes is important in a number of applications, such as energy conversion systems. External regulation approaches, such as water supply or manipulation at high temperatures, have been used so far to induce the self-humidification of membranes. However, these conventional approaches can lead to a slight improvement in ion conductivity but are still limited in achieving enhanced ionic selectivity (Patent Document 1).

Particularly, monolayer ion-exchange membranes can be used as electrolyte membranes for fuel cells. In this case, however, the electrolyte membranes tend to swell and lose their long-term stability because of their low ion-exchange capacity and poor long-term operational stability. Thus, numerous attempts have been made to develop a variety of composite electrolyte membranes with improved mechanical strength and high ion-exchange capacity. However, most of these electrolyte membranes have difficulty in satisfying both high ion-exchange capacity and good long-term operational stability, which is an obstacle to their commercialization (Patent Documents 2 and 3).

The present inventors have conducted intensive research to extend the application of aromatic hydrocarbon polymer ion-exchange membranes with good thermal/chemical stability and excellent mechanical properties, and as a result, have succeeded in introducing a thin hydrophobic layer capable of forming a nanocracked morphology pattern, analogous to the stomatal opening/closing mechanism of the cactus, into the surface of an ion-exchange membrane. The nanocracks work as nanoscale valves to retard water desorption and to maintain ion conductivity in the in the membrane upon dehumidification. Thus, when the hydration of the ion-exchange membrane is regulated in low-humidity or non-humidified environments without modification of the morphology of the ion-exchange membrane, greatly enhanced ionic selectivity with low bulk resistance is achieved. The outcome of this research has proven to be excellent and published in Nature, the world's leading scientific journal. However, the commercialization of the ion-exchange membrane requires the development of an ion-exchange composite membrane that satisfies both high ion-exchange capacity and good long-term operational stability (Non-Patent Document 1).

Under such circumstances, the present inventors have found that a self-humidifying ion-exchange composite membrane including an aromatic hydrocarbon polymer ion-exchange membrane formed on a porous polymer support with high mechanical strength and a thin hydrophobic coating layer having a nanocracked morphology pattern on the surface of the ion-exchange membrane has good thermal/chemical stability and high mechanical strength compared to conventional ion-exchange membranes. The present inventors have also found that particularly when the self-humidifying ion-exchange composite membrane is used as an electrolyte membrane of a fuel cell, the composite membrane improves the performance of the cell due to its high ion-exchange capacity and ensures long-term operational stability of the cell due to its improved durability, and as a result, it can be expected that the composite membrane will be commercialized. The present invention has been accomplished based on these findings.

PRIOR ART DOCUMENTS

Patent Documents

1. Korean Patent No. 10-0727216
2. Korean Patent No. 10-1178644
3. Korean Patent No. 10-1063215

Non-Patent Documents

1. Y. M. Lee et al., Nature 532, 480-483(2016)

DETAILED DESCRIPTION OF THE INVENTION

Problems to be Solved by the Invention

The present invention has been made in view of the above problems, and one object of the present invention is to provide a self-humidifying ion-exchange composite membrane that has good thermal/chemical stability, high mechanical strength, high ion-exchange capacity, and good long-term operational stability and is able to self-hydrate even under high-temperature and low-humidity conditions (120° C./35% RH). A further object of the present invention is to provide a method for fabricating the self-humidifying ion-exchange composite membrane.

Means for Solving the Problems

One aspect of the present invention provides a self-humidifying ion-exchange composite membrane including a) a porous polymer support, b) an aromatic hydrocarbon polymer ion-exchange membrane formed on the surface of the support, and c) a thin hydrophobic coating layer having a nanocracked morphology pattern on the surface of the ion-exchange membrane.

The porous polymer support is made of a polymer selected from the group consisting of polytetrafluoroethylene, thermally rearranged poly(benzoxazole-co-imide), thermally rearranged poly(benzothiazole-co-imide), thermally rearranged poly(pyrrolone-co-imide), polyethylene terephthalate, and a polyarylene ether sulfone copolymer.

The thermally rearranged poly(benzoxazole-co-imide) has a repeating unit represented by Formula 1:

<Formula 1>

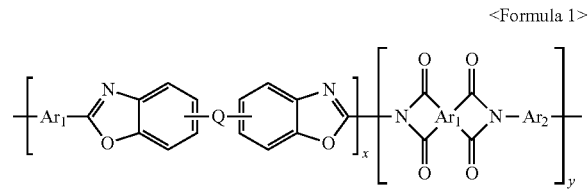

wherein each $Ar_1$ is an aromatic cyclic group selected from substituted or unsubstituted tetravalent $C_6$-$C_{24}$ arylene groups and substituted or unsubstituted tetravalent $C_4$-$C_{24}$ heterocyclic groups, with the proviso that the aromatic cyclic group exists alone or in plurality and that the aromatic cyclic groups together form a fused ring or are linked to each other via a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$ or CO—NH, $Ar_2$ is an aromatic cyclic group selected from substituted or unsubstituted divalent $C_6$-$C_{24}$ arylene groups and substituted or unsubstituted divalent $C_4$-$C_{24}$ heterocyclic groups, with the proviso that the aromatic cyclic group exists alone or in plurality and that the aromatic cyclic groups together form a fused ring or are linked to each other via a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$ or CO—NH, Q is a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$, CO—NH, $C(CH_3)(CF_3)$ or a substituted or unsubstituted phenylene group, and x and y representing the mole fractions of the corresponding structural units satisfy $0.1 \leq x \leq 0.9$, $0.1 \leq y \leq 0.9$, and $x+y=1$.

The polyarylene ether sulfone copolymer has a cross-linked repeating unit represented by Formula 2:

wherein each Q is a single bond, O, S, C(=O), C(=O)NH, $Si(CH_3)_2$, $(CH_2)_p$ ($1 \leq p \leq 10$), $(CF_2)_q$ ($1 \leq q \leq 10$), $C(CH_3)_2$, $C(CF_3)_2$ or $C(CH_3)(CF_3)$ and n representing the molar ratio of the corresponding structural units satisfies $0<n<1$.

The porous polymer support is an electrospun film or non-woven fabric.

The aromatic hydrocarbon polymer is selected from the group consisting of polybenzimidazole, polybenzoxazole, polyimide, polyetherimide, polyphenylene sulfide, polysulfone, polyethersulfone, polyetherketone, polyetheretherketone, polyphenylquinoxaline, copolymers thereof, and combinations thereof.

The aromatic hydrocarbon polymer ion-exchange membrane includes: an aromatic hydrocarbon polymer including a first repeating unit represented by Formula 3:

<Formula 3>

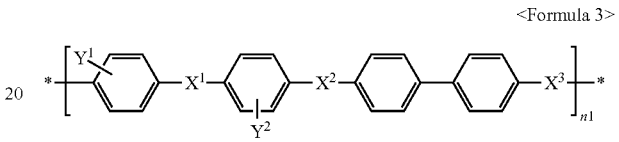

wherein $X^1$, $X^2$, and $X^3$ may be identical to or different from each other and are each independently $SO_2$ or O, $Y_1$ and $Y_2$ are each independently $SO_3H$ or $SO_3Na$, and n1 is an integer from 30 to 70, and a second repeating unit represented by Formula 4:

<Formula 4>

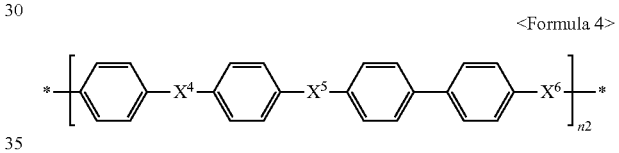

wherein $X^4$, $X^5$, and $X^6$ may be identical to or different from each other and are each independently $SO_2$ or O, n2 is 100−n1, and n1 is an integer from 30 to 70; and/or an aromatic hydrocarbon polymer represented by Formula 5, 6 or 7:

<Formula 2>

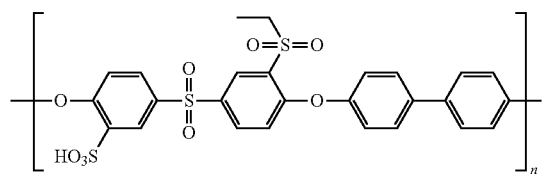

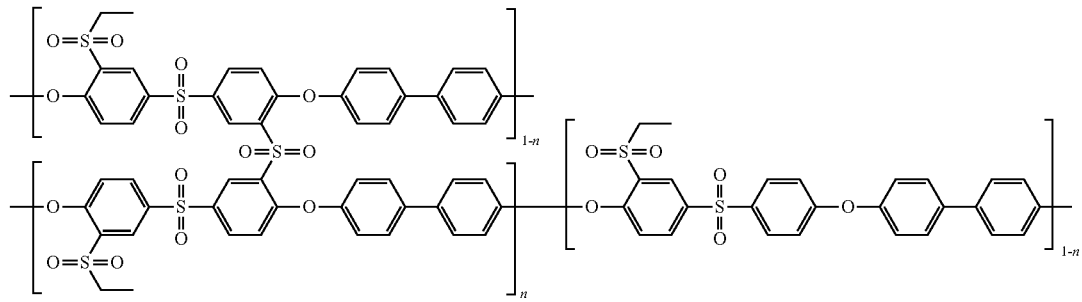

<Formula 5>

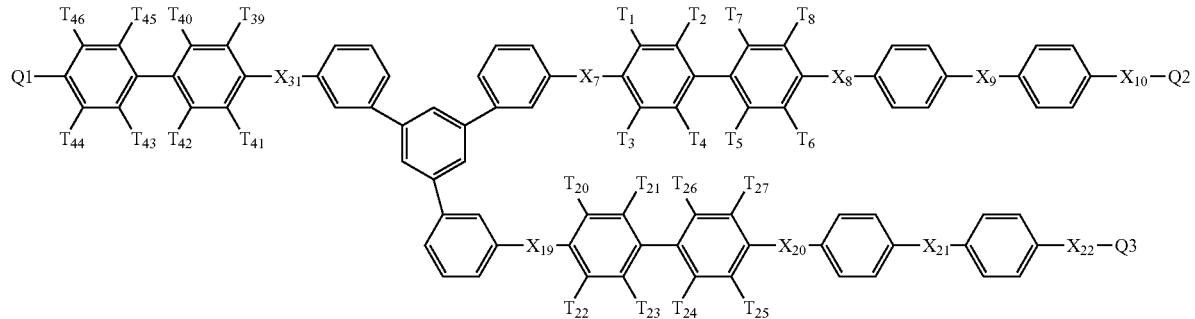

wherein $X_7$, $X_8$, $X_9$, $X_{10}$, $X_{19}$, $X_{20}$, $X_{21}$, $X_{22}$, and $X_{31}$ may be identical to or different from each other and are each independently sulfide (S), ether (O) or sulfone (SO$_2$), $T_1$, $T_2$, $T_3$, $T_4$, $T_5$, $T_6$, $T_7$, $T_8$, $T_{20}$, $T_{21}$, $T_{22}$, $T_{23}$, $T_{24}$, $T_{25}$, $T_{26}$, $T_{27}$, $T_{39}$, $T_{40}$, $T_{41}$, $T_{42}$, $T_{43}$, $T_{44}$, and $T_{45}$ may be identical to or different from each other and are each independently fluoro (F), cyano (CN) or sulfo (SO$_3$H), Q1 is represented by Formula 5a:

<Formula 5a>

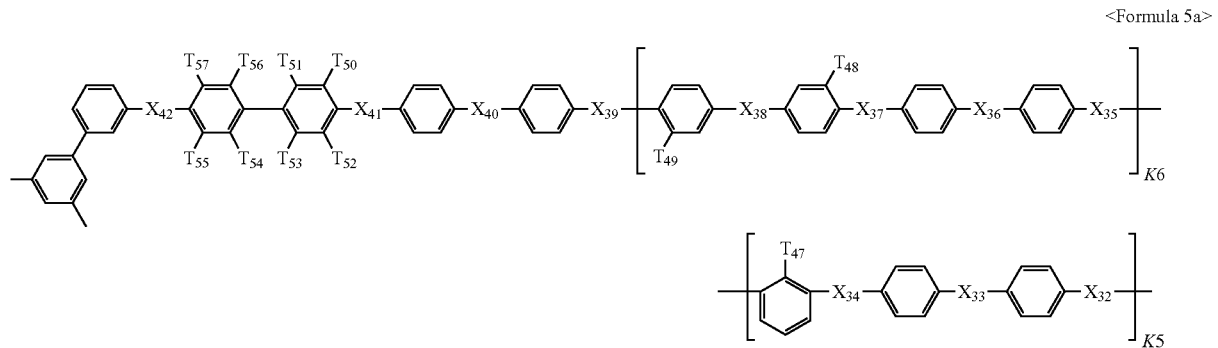

wherein $X_{32}$, $X_{33}$, $X_{34}$, $X_{35}$, $X_{36}$, $X_{37}$, $X_{39}$, $X_{40}$, $X_{41}$, and $X_{42}$ may be identical to or different from each other and are each independently sulfide (S), ether (O) or sulfone (SO$_2$), $X_{38}$ is sulfone (SO$_2$), $T_{50}$, $T_{51}$, $T_{52}$, $T_{53}$, $T_{54}$, $T_{55}$, $T_{56}$, and $T_{57}$ may be identical to or different from each other and are each independently fluoro (F), cyano (CN) or sulfo (SO$_3$H), each of $T_{48}$ and $T_{49}$ is sulfo (SO$_3$H), $T_{47}$ is cyano (CN), k5 representing the mole fraction of the corresponding hydrophilic moiety is a real number from 0.4 to 0.6, and k6 representing the mole fraction of the corresponding hydrophobic moiety is a real number from 0.6 to 0.4 satisfying 1-k5, Q2 is represented by Formula 5b:

<Formula 5b>

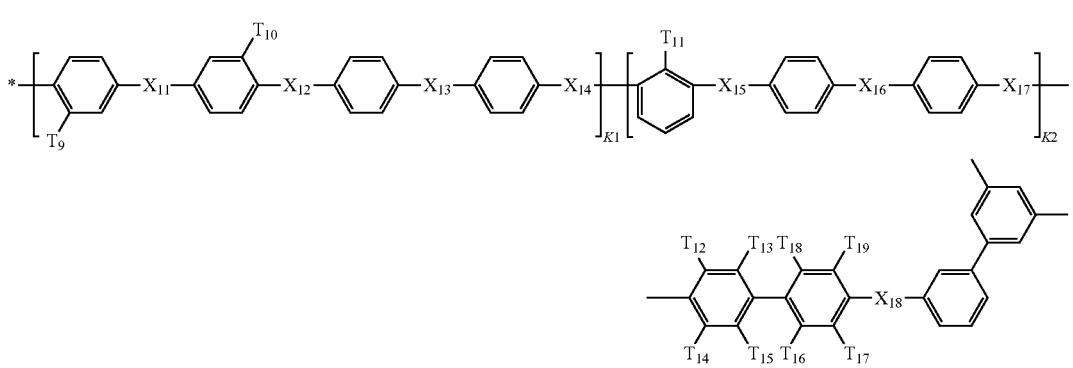

wherein $X_{12}$, $X_{13}$, $X_{14}$, $X_{15}$, $X_{16}$, $X_{17}$, and $X_{18}$ may be identical to or different from each other and are each independently sulfide (S), ether (O) or sulfone ($SO_2$), $X_{11}$ is sulfone ($SO_2$), $T_{12}$, $T_{13}$, $T_{14}$, $T_{15}$, $T_{16}$, $T_{17}$, $T_{18}$, and $T_{19}$ may be identical to or different from each other and are each independently fluoro (F), cyano (CN) or sulfo ($SO_3H$), each of $T_9$ and $T_{10}$ are sulfo ($SO_3H$), $T_{11}$ is cyano (CN), k1 representing the mole fraction of the corresponding hydrophilic moiety is a real number from 0.4 to 0.6, and k2 representing the mole fraction of the corresponding hydrophobic moiety is a real number from 0.6 to 0.4 satisfying 1-k1, and Q3 is represented by Formula 5c:

<Formula 5c>

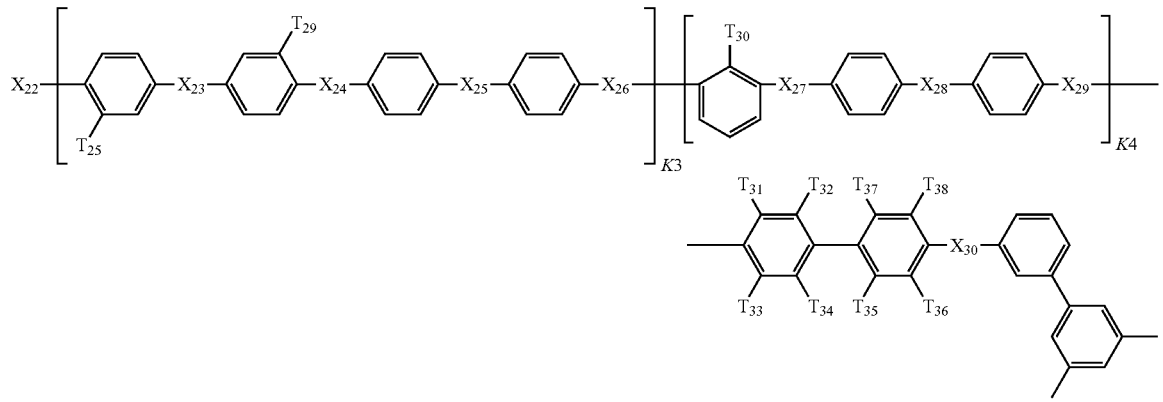

wherein $X_{22}$, $X_{24}$, $X_{25}$, $X_{26}$, $X_{27}$, $X_{28}$, $X_{29}$, and $X_{30}$ may be identical to or different from each other and are each independently sulfide (S), ether (O) or sulfone ($SO_2$), $X_{23}$ is sulfone ($SO_2$), $T_{31}$, $T_{32}$, $T_{33}$, $T_{34}$, $T_{35}$, $T_{36}$, $T_{37}$, and $T_{38}$ may be identical to or different from each other and are each independently fluoro (F), cyano (CN) or sulfo ($SO_3H$), $T_{28}$ and $T_{29}$ are each independently sulfo ($SO_3H$), $T_{30}$ is cyano (CN), k3 representing the mole fraction of the corresponding hydrophilic moiety is a real number from 0.4 to 0.6, and k4 representing the mole fraction of the corresponding hydrophobic moiety is a real number from 0.6 to 0.4 satisfying 1-k3, <Formula 6>

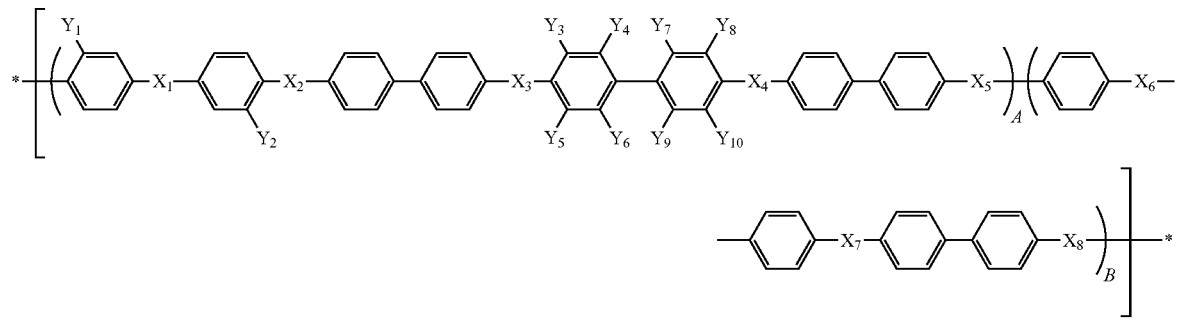

wherein $X_1$, $X_2$, $X_3$, $X_4$, $X_5$, $X_6$, $X_7$, and $X_8$ may be identical to or different from each other and are each independently $SO_2$ or O, $Y_1$ and $Y_2$ are each independently $SO_3H$ or $SO_3Na$, each of $Y_3$, $Y_4$, $Y_5$, $Y_6$, $Y_7$, $Y_8$, $Y_9$, and $Y_{10}$ is fluoro (F), A is an integer from 5 to 30, and B is an integer from 10 to 40, <Formula 7>

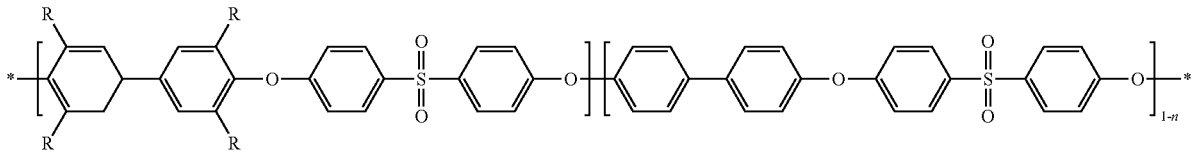

wherein each R is $CH_2N(CH_3)_3Cl$ and n is an integer from 30 to 70.

The thin hydrophobic coating layer includes $—CF_2—$, $—CF_3$ or a combination thereof as a hydrophobic functional group.

The thin hydrophobic coating layer has a thickness of 10 to 1000 nm.

The present invention also provides a method for fabricating a self-humidifying ion-exchange composite membrane, including I) producing a porous polymer support, II) coating an aromatic hydrocarbon polymer on the surface of the support to form an ion-exchange membrane, and III) treating the ion-exchange membrane 3 to 40 times with an atmospheric plasma.

The coating is performed by immersing the porous polymer support in a solution of the aromatic hydrocarbon polymer.

The atmospheric plasma treatment is performed by blowing a first gas selected from argon gas, nitrogen gas, oxygen gas, helium gas, and combinations thereof and a second gas selected from a hydrocarbon gas, a fluorocarbon gas, and a combination thereof.

The hydrocarbon gas is $CH_4$ gas or $C_2H_2$ gas.

The fluorocarbon gas is $C_4F_8$ gas, $CF_4$ gas or a combination thereof.

The present invention also provides a fuel cell including the self-humidifying ion-exchange composite membrane.

Effects of the Invention

The self-humidifying ion-exchange composite membrane of the present invention has good thermal/chemical stability, high mechanical strength, high ion-exchange capacity, and good long-term operational stability. Particularly, the self-humidifying ion-exchange composite membrane of the present invention is able to self-hydrate even under high-temperature and low-humidity conditions (120° C./35% RH). Due to these advantages, it is expected that the self-humidifying ion-exchange composite membrane of the present invention will be commercialized as an electrolyte membrane for a fuel cell or a membrane for water treatment.

BEST MODE FOR CARRYING OUT THE INVENTION

Figure 1:
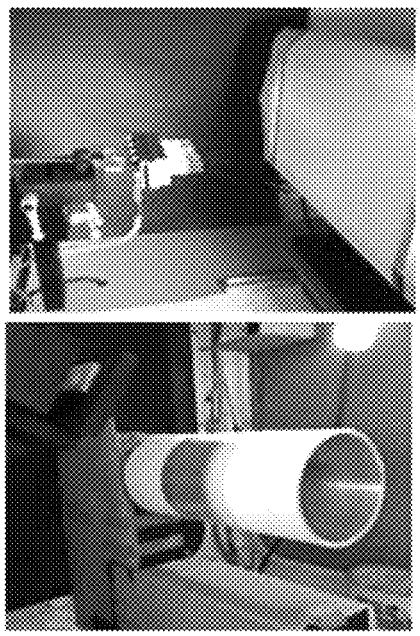
FIG. 1. Images showing a process and system for producing a cross-linked sulfonated polyarylene ether sulfone copolymer support (electrospun membrane) and a final electrospun membrane produced thereby.
Figure 1:
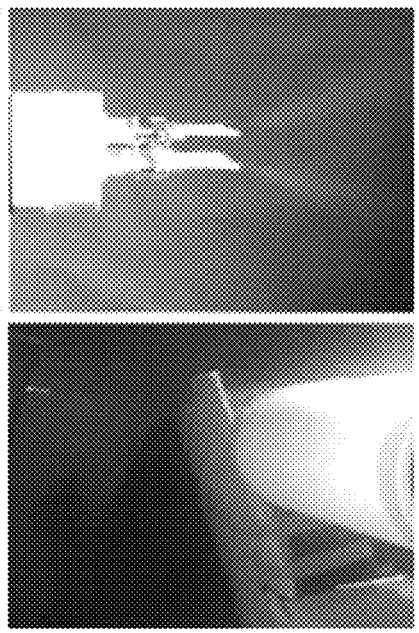
Figure 1:
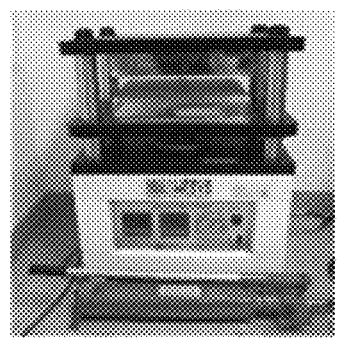
Figure 1:
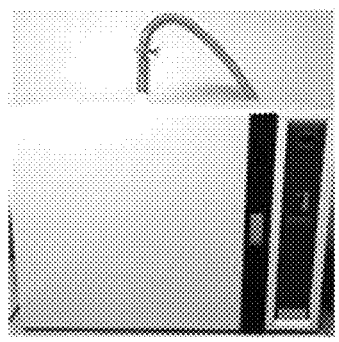
Figure 1:
Figure 1:

A self-humidifying ion-exchange composite membrane and a method for fabricating the composite membrane according to the present invention will now be described in detail with reference to the accompanying drawings.

The present invention provides a self-humidifying ion-exchange composite membrane including a) a porous polymer support, b) an aromatic hydrocarbon polymer ion-exchange membrane formed on the surface of the support, and c) a thin hydrophobic coating layer having a nanocracked morphology pattern on the surface of the ion-exchange membrane.

The porous polymer support serves to improve the mechanical strength of the composite membrane. The porous polymer support may be hydrophobic or hydrophilic or may include conductive groups. For example, the porous polymer support is a polymer selected from the group consisting of polytetrafluoroethylene, thermally rearranged poly(benzoxazole-co-imide), thermally rearranged poly(benzothiazole-co-imide), thermally rearranged poly(pyrrolone-co-imide), polyethylene terephthalate, and a polyarylene ether sulfone copolymer. Thermally rearranged poly(benzoxazole-co-imide) or a polyarylene ether sulfone copolymer is more preferred.

It is more particularly preferred that the thermally rearranged poly(benzoxazole-co-imide) has a repeating unit represented by Formula 1:

<Formula 1>

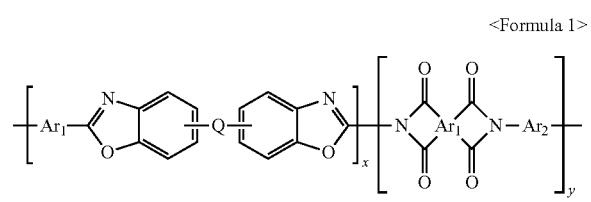

wherein each $Ar_1$ is an aromatic cyclic group selected from substituted or unsubstituted tetravalent $C_6$-$C_{24}$ arylene groups and substituted or unsubstituted tetravalent $C_4$-$C_{24}$ heterocyclic groups, with the proviso that the aromatic cyclic group exists alone or in plurality and that the aromatic cyclic groups together form a fused ring or are linked to each other via a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$ or CO—NH, $Ar_e$ is an aromatic cyclic group selected from substituted or unsubstituted divalent $C_6$-$C_{24}$ arylene groups and substituted or unsubstituted divalent $C_4$-$C_{24}$ heterocyclic groups, with the proviso that the aromatic cyclic group exists alone or in plurality and that the aromatic cyclic groups together form a fused ring or are linked to each other via a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$ or CO—NH, Q is a single bond, O, S, CO, $SO_2$, $Si(CH_3)_2$, $(CH_2)_p$ ($1 \leq p \leq 10$), $(CF_2)_q$ ($1 \leq q \leq 10$), $C(CH_3)_2$, $C(CF_3)_2$, CO—NH, $C(CH_3)(CF_3)$ or a substituted or unsubstituted phenylene group, and x and y representing the mole fractions of the corresponding structural units satisfy $0.1 \leq x \leq 0.9$, $0.1 \leq y \leq 0.9$, and $x+y=1$.

More preferably, the polyarylene ether sulfone copolymer has a cross-linked repeating unit represented by Formula 2:

<Formula 2>

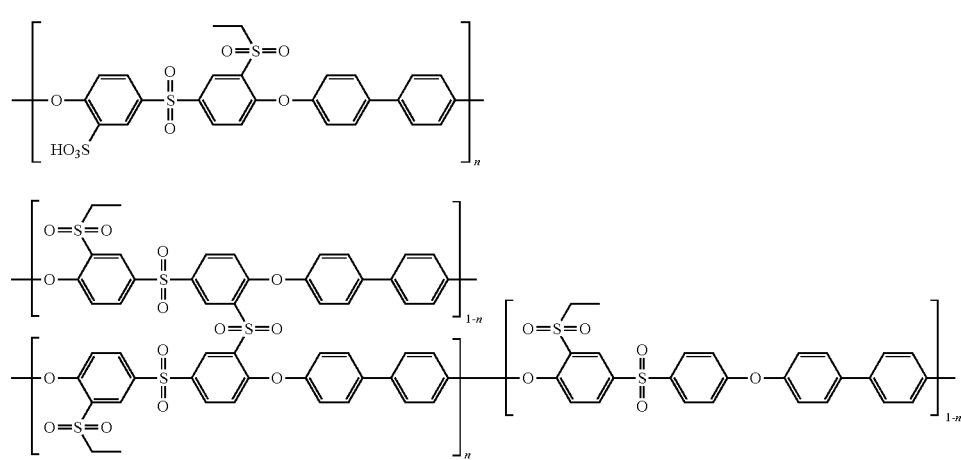

wherein each Q is a single bond, O, S, C(=O), C(=O)NH, $Si(CH_3)_2$, $(CH_2)_p$ ($1 \leq p \leq 10$), $(CF_2)_q$ ($1 \leq q \leq 10$), $C(CH_3)_2$, $C(CF_3)_2$ or $C(CH_3)(CF_3)$ and n representing the molar ratio of the corresponding structural units satisfies $0<n<1$.

The cross-linked sulfonated polyarylene ether sulfone copolymer having the repeating unit represented by Formula 2 is prepared by thermally treating a sulfonated polyarylene ether sulfone copolymer having a repeating unit represented by Formula I:

<Formula I>

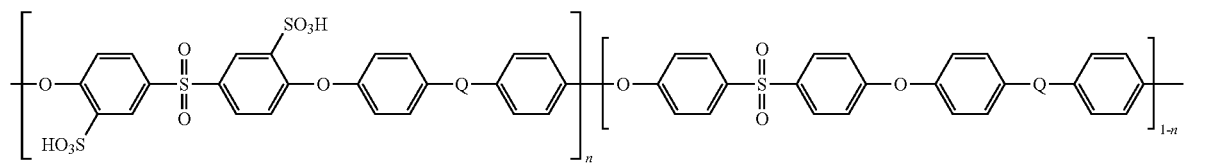

wherein Q and n are as defined in Formula 2.

The thermal treatment enables cross-linking of the polymer skeleton. The degree of sulfonation of the cross-linked sulfonated polyarylene ether sulfone copolymer is adjusted to the range of 10 to 90%.

The use of the polymer having sulfonated groups for the preparation of the cross-linked sulfonated polyarylene ether sulfone copolymer having the repeating unit represented by Formula 2 enhances the hydrophilicity of the support, thus being effective in lowering the internal concentration polarization of the composite membrane and improving the anti-fouling properties of the composite membrane. In addition, the cross-linking of the polymer skeleton having sulfonated groups ensures improved mechanical properties and chemical stability, enabling the application of the composite membrane to fuel cell electrolyte membranes and water treatment membranes.

The porous polymer support is preferably is an electrospun film or non-woven fabric. Generally, electrospinning is employed to form an electrospun membrane into a thin, highly porous support having an interconnected pore structure in which fibers having a size of hundreds of nanometers are stacked from the bottom up.

The aromatic hydrocarbon polymer can be used as a material for the ion-exchange membrane because of its good thermal/chemical stability and excellent mechanical properties. The aromatic hydrocarbon polymer is selected from the group consisting of polybenzimidazole, polybenzoxazole, polyimide, polyetherimide, polyphenylene sulfide, polysulfone, polyethersulfone, polyetherketone, polyetheretherketone, polyphenylquinoxaline, copolymers thereof, and combinations thereof, which have cation or anion-exchange groups in the side chains.

The aromatic hydrocarbon polymer ion-exchange membrane includes: an aromatic hydrocarbon polymer including a first repeating unit represented by Formula 3:

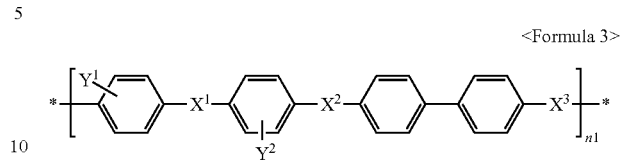

<Formula 3> wherein $X^1$, $X^2$, and $X^3$ may be identical to or different from each other and are each independently $SO_2$ or $0$, $Y_1$ and $Y_2$ are each independently $SO_3H$ or $SO_3Na$, and n1 is an integer from 30 to 70, and a second repeating unit represented by Formula 4:

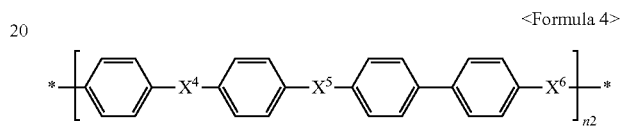

<Formula 4> wherein $X^4$, $X^5$, and $X^6$ may be identical to or different from each other and are each independently $SO_2$ or $0$, n2 is 100−n1, and n1 is an integer from 30 to 70; and/or an aromatic hydrocarbon polymer represented by Formula 5, 6 or 7:

<Formula 5>

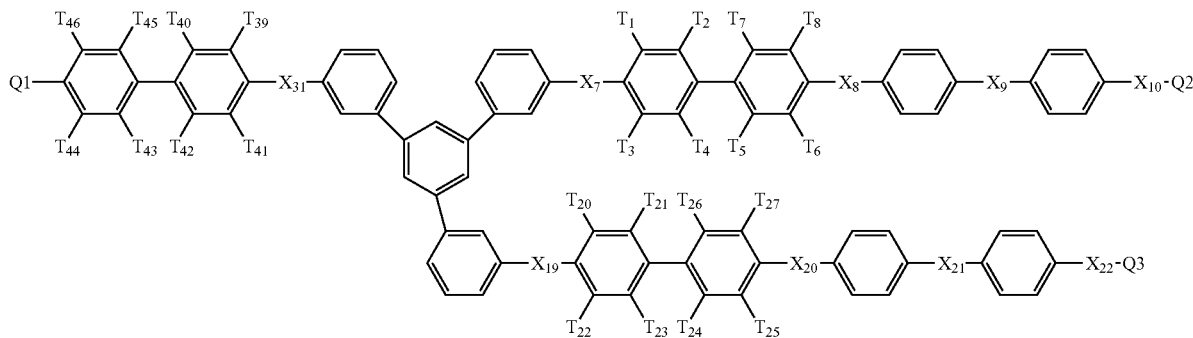

wherein $X_7$, $X_8$, $X_9$, $X_{10}$, $X_{19}$, $X_{20}$, $X_{21}$, $X_{22}$, and $X_{31}$ may be identical to or different from each other and are each independently sulfide (S), ether (O) or sulfone ($SO_2$), $T_1$, $T_2$, $T_3$, $T_4$, $T_5$, $T_6$, $T_7$, $T_8$, $T_{20}$, $T_{21}$, $T_{22}$, $T_{23}$, $T_{24}$, $T_{25}$, $T_{26}$, $T_{27}$, $T_{39}$, $T_{40}$, $T_{41}$, $T_{42}$, $T_{43}$, $T_{44}$, and $T_{45}$ may be identical to or different from each other and are each independently fluoro (F), cyano (CN) or sulfo ($SO_3H$), Q1 is represented by Formula 5a:

<Formula 5a>

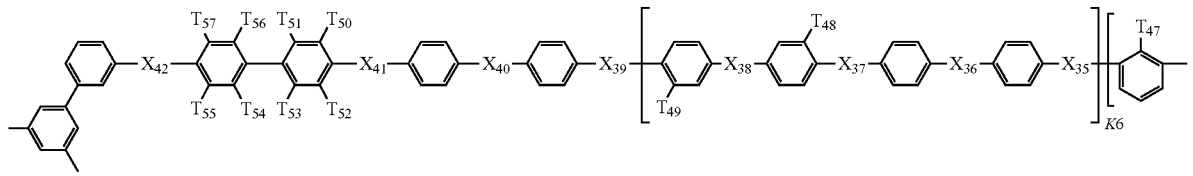

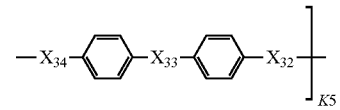

wherein $X_{32}$, $X_{33}$, $X_{34}$, $X_{35}$, $X_{36}$, $X_{37}$, $X_{39}$, $X_{40}$, $X_{41}$, and $X_{42}$ may be identical to or different from each other and are each independently sulfide (S), ether (O) or sulfone ($SO_2$), $X_{38}$ is sulfone ($SO_2$), $T_{50}$, $T_{51}$, $T_{52}$, $T_{53}$, $T_{54}$, $T_{55}$, $T_{56}$, and $T_{57}$ may be identical to or different from each other and are each independently fluoro (F), cyano (CN) or sulfo ($SO_3H$), each of $T_{48}$ and $T_{49}$ is sulfo ($SO_3H$), $T_{47}$ is cyano (CN), k5 representing the mole fraction of the corresponding hydrophilic moiety is a real number from 0.4 to 0.6, and k6 representing the mole fraction of the corresponding hydrophobic moiety is a real number from 0.6 to 0.4 satisfying 1−k5, Q2 is represented by Formula 5b:

<Formula 5b>

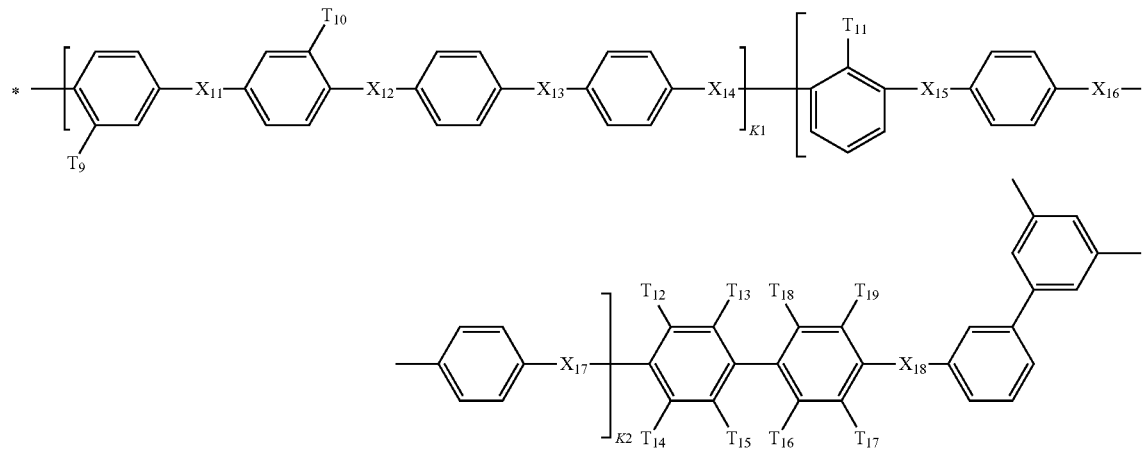

wherein $X_{12}$, $X_{13}$, $X_{14}$, $X_{15}$, $X_{16}$, $X_{17}$, and $X_{18}$ may be identical to or different from each other and are each independently sulfide (S), ether (O) or sulfone ($SO_2$), $X_{11}$ is sulfone ($SO_2$), $T_{12}$, $T_{13}$, $T_{14}$, $T_{15}$, $T_{16}$, $T_{17}$, $T_{18}$, and $T_{19}$ may be identical to or different from each other and are each independently fluoro (F), cyano (CN) or sulfo ($SO_3H$), each of $T_9$ and $T_{10}$ are sulfo ($SO_3H$), $T_{11}$ is cyano (CN), k1 representing the mole fraction of the corresponding hydrophilic moiety is a real number from 0.4 to 0.6, and k2 representing the mole fraction of the corresponding hydrophobic moiety is a real number from 0.6 to 0.4 satisfying 1-k1, and Q3 is represented by Formula 5c:

<Formula 5c>

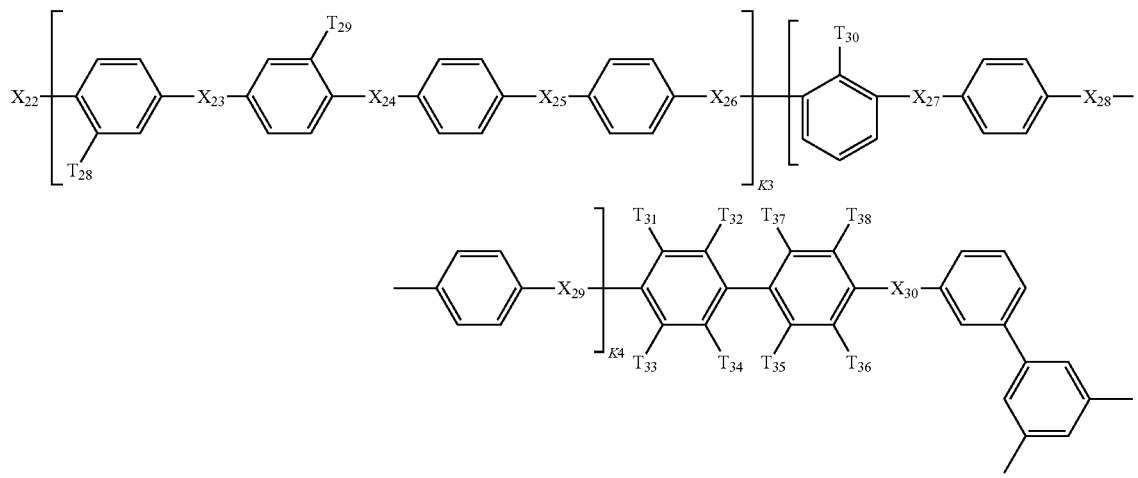

wherein $X_{22}$, $X_{24}$, $X_{25}$, $X_{26}$, $X_{27}$, $X_{28}$, $X_{29}$, and $X_{30}$ may be identical to or different from each other and are each independently sulfide (S), ether (O) or sulfone ($SO_2$), $X_{23}$ is sulfone ($SO_2$), $T_{31}$, $T_{32}$, $T_{33}$, $T_{34}$, $T_{35}$, $T_{36}$, $T_{37}$, and $T_{38}$ may be identical to or different from each other and are each independently fluoro (F), cyano (CN) or sulfo ($SO_3H$), $T_{28}$ and $T_{29}$ are each independently sulfo ($SO_3H$), $T_{30}$ is cyano (CN), k3 representing the mole fraction of the corresponding hydrophilic moiety is a real number from 0.4 to 0.6, and k4 representing the mole fraction of the corresponding hydrophobic moiety is a real number from 0.6 to 0.4 satisfying 1−k3, That is, when the ion-exchange membrane absorbs water and swells, the intervals between the nanocracks increase and the water channels are open depending on the swelling ratio of the ion-exchange membrane. When the hydrated ion-exchange membrane is dried, the intervals between the nanocracks decrease and the water channels are closed, with the result that the dehydration is delayed and the ion-exchange membrane is not completely dried and remains hydrated. The water retention in the ion-exchange membrane enables effective ion transfer through the ion-exchange membrane even under medium-to-high temperature <Formula 6>

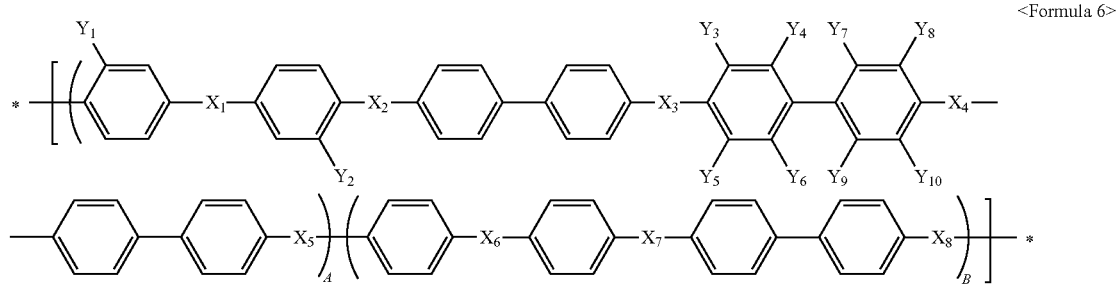

wherein $X_1$, $X_2$, $X_3$, $X_4$, $X_5$, $X_6$, $X_7$, and $X_8$ may be identical to or different from each other and are each independently $SO_2$ or O, $Y_1$ and $Y_2$ are each independently $SO_3H$ or $SO_3Na$, each of $Y_3$, $Y_4$, $Y_5$, $Y_6$, $Y_7$, $Y_8$, $Y_9$, and $Y_{10}$ is fluoro (F), A is an integer from 5 to 30, and B is an integer from 10 to 40, and low-humidity conditions. Thus, the ion-exchange membrane is considered self-humidifying.

The thin hydrophobic coating layer may include —$CF_2$—, —$CF_3$ or a combination thereof as a hydrophobic functional group. The thickness of the thin hydrophobic coating layer is preferably from 10 to 1000 nm, more <Formula 7>

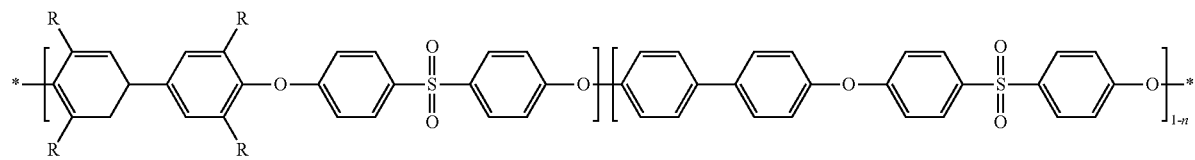

wherein each R is $CH_2N(CH_3)_3Cl$ and n is an integer from 30 to 70.

The self-humidifying ion-exchange composite membrane includes a thin hydrophobic coating layer having a nanocracked morphology pattern on the surface of the ion-exchange membrane.

Figure 11:
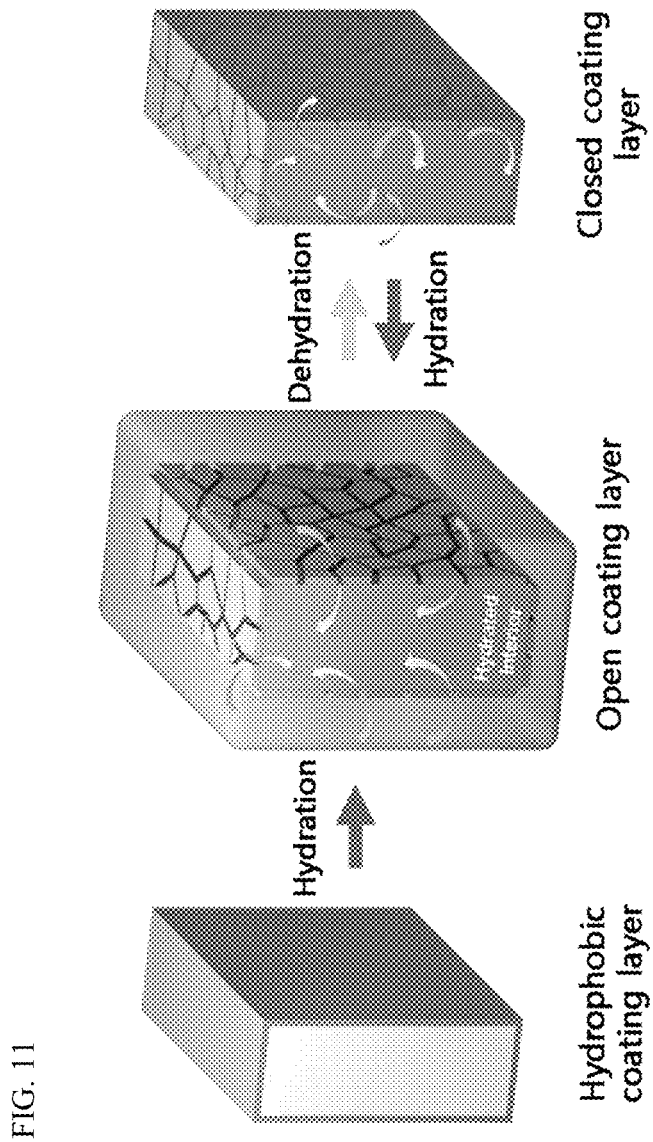
FIG. 11. Conceptual diagram of a thin water-impermeable hydrophobic layer deposited on the surface of a membrane to regulate water exchange at the membrane surface.

The thin hydrophobic coating layer having a nanocracked morphology pattern employs the stomatal opening/closing mechanism of the cactus as a model and is based on a new concept for regulating membrane hydration in low-humidity or non-humidified environments without modification of the morphology of the ion-exchange membrane. As shown in FIG. 11, a thin water-impermeable hydrophobic layer deposited (coated) on the membrane surface to regulate water exchange at the membrane surface. The hydrophobic layer must resolve the paradox of conserving water within the bulk membrane while simultaneously not hindering ions that co-transport with water molecules through the surface of the membrane. It is noteworthy that for an ion-conduction mechanism in which water is the transport medium, even very thin hydrophobic barriers can drastically reduce ion conductivity. Accordingly, to overcome this paradox, the thin hydrophobic layer having water channels (nanocracks), which are open under humidifying conditions, is deposited on the surface of the ion-exchange membrane in the present invention.

preferably from 10 to 15 nm. If the thickness of the thin hydrophobic coating layer is outside the range defined above, the resistance of the membrane may increase, resulting in low ion conductivity.

The present invention also provides a method for fabricating a self-humidifying ion-exchange composite membrane, including I) producing a porous polymer support, II) coating an aromatic hydrocarbon polymer on the surface of the support to form an ion-exchange membrane, and III) treating the ion-exchange membrane 3 to 40 times with an atmospheric plasma.

In step I), a porous polymer support is produced. Any commercial support may be used as the porous polymer support. The porous polymer support may be produced by forming the thermally rearranged poly(benzoxazole-co-imide) having the repeating unit represented by Formula 1 or the cross-linked polyarylene ether sulfone copolymer having the repeating unit represented by Formula 2 into an electrospun membrane by any suitable process known in the art.

In subsequent step II), an aromatic hydrocarbon polymer is coated on the surface of the support to form an ion-exchange membrane. The aromatic hydrocarbon polymer may be the same as the material for the support. Alternatively, the aromatic hydrocarbon polymer may be selected from the group consisting of polybenzimidazole, polybenzoxazole, polyimide, polyetherimide, polyphenylene sulfide, polysulfone, polyethersulfone, polyetherketone, polyetheretherketone, polyphenylquinoxaline, copolymers thereof, and combinations thereof, which have cation or anion-exchange groups in the side chains. The coating is preferably performed by immersing the porous polymer support in a solution of the aromatic hydrocarbon polymer.

In final step III), the ion-exchange membrane is treated 3 to 40 times with an atmospheric plasma.

The atmospheric plasma treatment is performed by exposing the surface of the ion-exchange membrane to a partially ionized gas in a plasma state to modify the surface of the ion-exchange membrane. Since the surface modification occurs very locally, the ion-exchange membrane is less damaged, the internal physical properties of the ion-exchange membrane are not significantly changed, and less pollutants are released.

The atmospheric plasma treatment is performed by blowing a first gas selected from argon gas, nitrogen gas, oxygen gas, helium gas, and combinations thereof and a second gas selected from a hydrocarbon gas, a fluorocarbon gas, and a combination thereof. The hydrocarbon gas may be $CH_4$ gas or $C_2H_2$ gas. The fluorocarbon gas may be $C_4F_8$ gas, $CF_4$ gas or a combination thereof.

If the atmospheric plasma treatment is repeated less than three times, a hydrophobic coating layer is not sufficiently deposited. This insufficient deposition leads to incomplete formation of the coating layer. Meanwhile, if the atmospheric plasma treatment is repeated more than 40 times, plasma polymerization is excessively activated. This excessive activation leads to the formation of a very thick coating, resulting in low ion conductivity.

Figure 12:
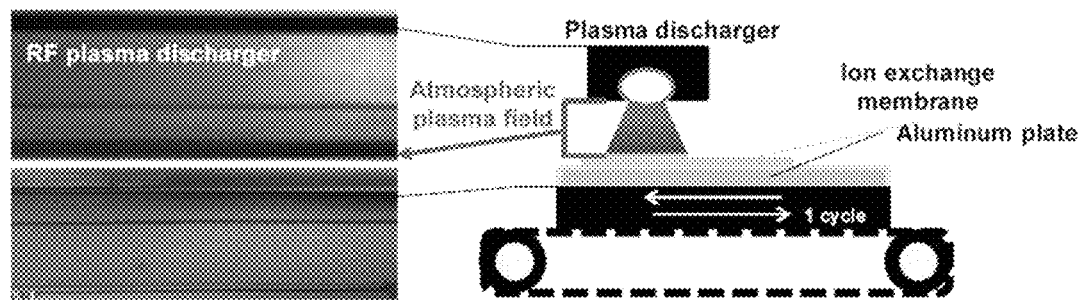
FIG. 12. (a) plasma treatment system used in the present invention and (b) mechanism of forming a thin fluorocarbon polymer coating layer.
Figure 12:
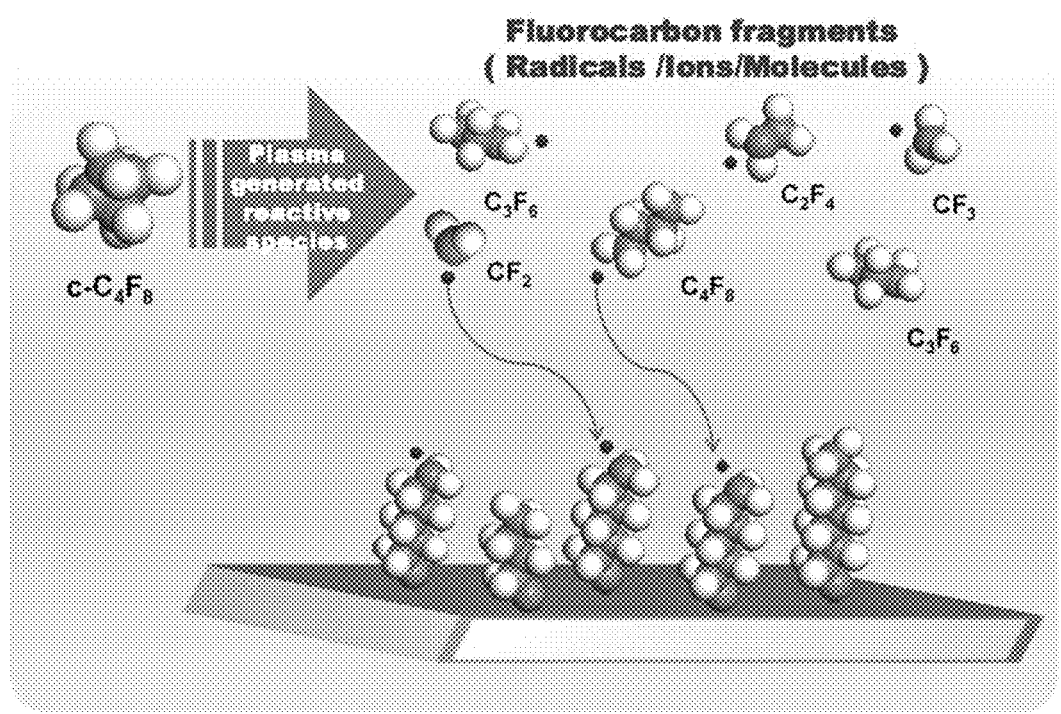

In one embodiment, the atmospheric plasma treatment is performed using helium gas as the first gas and octafluorocyclobutane ($C_4F_8$) gas as the second gas. The first gas acts as a carrier gas and the second gas acts as a reaction gas. At this time, radio-frequency (RF) is supplied to generate radicals such as —$CF_2$ and —$CF_3$, ions, and plasma at ambient pressure. This procedure is repeated 3 to 40 times to effectively deposit (coat) a 10 to 1000 nm thick fluorocarbon polymer thin film layer on the surface of the aromatic hydrocarbon polymer ion-exchange membrane. The deposited polymer thin film layer increases the hydrophobicity of the aromatic hydrocarbon polymer ion-exchange membrane. According to a conventional hydrophobic treatment process, the addition of hydrophobic inorganic/organic particles and materials changes the overall physical properties and structure of an ion-exchange membrane. In contrast, according to the atmospheric plasma treatment in the method of the present invention, only the morphology and hydrophilicity/hydrophobicity of the surface can be changed without any changes in the physical properties and physicochemical structure of the ion-exchange membrane. The method of the present invention enables conveyor belt type high capacity continuous plasma treatment and control over plasma polymerization suitable for the hydrophobic surface treatment of the ion-exchange membrane, unlike atmospheric plasma treatment based on dielectric barrier discharge (DBD). FIG. 12 shows (a) a plasma treatment system used in the present invention and (b) a mechanism of forming a fluorocarbon polymer thin film layer.

According to the atmospheric plasma treatment, the structure of the hydrophobic plasma coating layer varies depending on the ratio between the nano-sized hydrophilic domains and hydrophobic domains of the aromatic hydrocarbon polymer ion-exchange membrane, 10 nm to 500 nm wide nanocracks are formed on the surface of the hydrophobic plasma coating layer depending on the expansion rate of the ion-exchange membrane upon hydration, the size of the nanocracks is reduced to 5 nm to 100 nm depending on the water content and expansion rate during subsequent drying, the distribution of the nanocracks is controlled such that the release of water from the ion-exchange membrane is effectively delayed, ensuring high water retention capacity under medium-to-high-temperature and low-humidity conditions (30-120° C./30%-100% RH). This mechanism of controlling the hydrophobic plasma coating layer is reversibly controllable depending on the hydration conditions and improves the durability of the ion-exchange membrane. This self-regulating surface control system has not been reported in conventional hydrophobic plasma coating layers (>1 µm) formed on the surfaces of polymer films and inorganic materials and enables control over surface morphology by hygroscopic swelling rather than by simple hydrophobic treatment.

Particularly, the polyarylene ether sulfone ion-exchange membrane having sulfonated groups ($SO_3H$ or $SO_3Na$) forms an intrinsic hydrophilic nanocracked surface morphology depending on the degree of sulfonation (40-60) and effectively retards the diffusion of water from the ion-exchange membrane without reductions in inherent ion conductivity and ion-exchange capacity, achieving improved ion conductivity even under low-humidity conditions.

The present invention also provides a fuel cell including the self-humidifying ion-exchange composite membrane.

MODE FOR CARRYING OUT THE INVENTION

The present invention will be specifically explained with reference to the following examples and the accompanying drawings.

Example 1

A sulfonated polyarylene ether sulfone represented by Formula Ia was synthesized by a known method.

[Formula Ia]

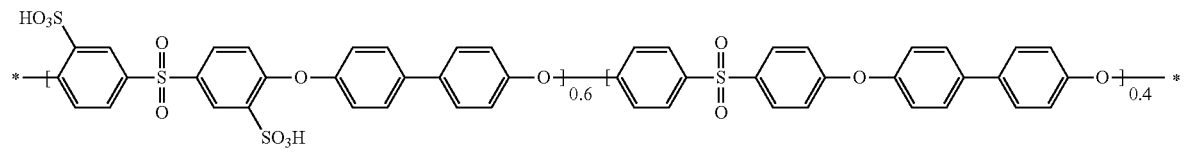

A solution of the sulfonated polyarylene ether sulfone (10 wt %) in N-methylpyrrolidone (NMP) was prepared. After 6 ml of the polymer solution was loaded in a 10 ml syringe with a 23G needle, the syringe was mounted in a syringe pump of an electrospinning system (ES-robot, NanoNC, Korea). The polymer solution was spun under general electrospinning conditions to obtain an electrospun membrane (BPSH60). The electrospun membrane was heated at 180° C. for 4 h under a dimethyl sulfoxide (DMSO) vapor atmosphere to form a cross-linked porous sulfonated polyarylene ether sulfone copolymer (Formula Ib) electrospun membrane (cross-linked BPSH60).

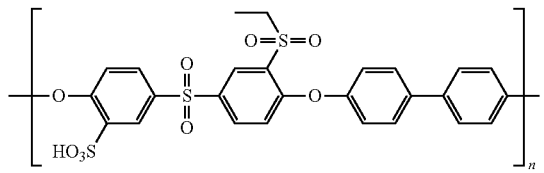

[Formula Ib]

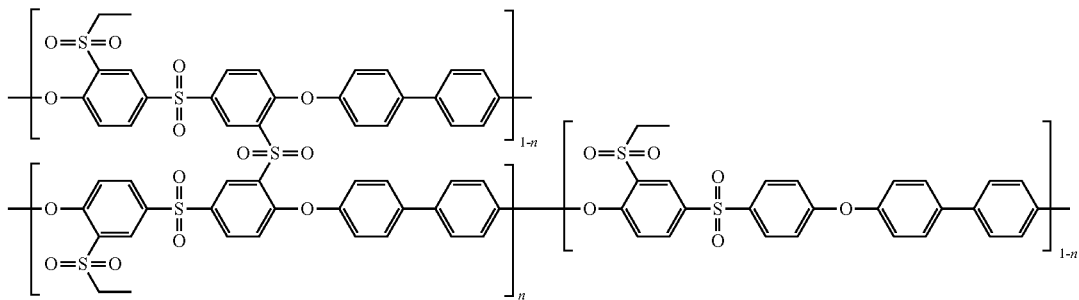

(wherein n is 0.6)

The process and system for the production of the cross-linked BPSH60 is shown in FIG. 1. The electrospun membrane was stably produced without defects.

Subsequently, the cross-linked porous sulfonated polyarylene ether sulfone copolymer electrospun membrane was immersed in the solution of the sulfonated polyarylene ether sulfone copolymer to form an ion-exchange membrane thereon (BPSH-RPCM). Then, the ion-exchange membrane formed on the surface of the electrospun membrane (support) was placed on a sample holder such that its one surface was directed toward an overlying atmospheric plasma generator and the opposite surface was directed toward the bottom of the sample holder. At that time, the ion-exchange membrane was treated with an atmospheric plasma at a 13.56 MHz RF and a 105 W power while blowing helium gas at a rate of 20 L/min and $C_4F_8$ gas at a rate 10 ml/min. The atmospheric plasma treatment was repeated 30 times to fabricate a self-humidifying ion-exchange composite membrane (P-BPSH-RPCM).

Example 2

A self-humidifying ion-exchange composite membrane (P-PET RCM R20) was fabricated in the same manner as in Example 1, except that a commercial polyethylene terephthalate (PET) non-woven fabric was used as a porous polymer support, a sulfonated polyarylene ether sulfone (BPSH60, Formula Ia) ion-exchange membrane (PET RCM) was formed on the surface of the PET non-woven fabric, and the ion-exchange membrane (PET RCM) was treated 20 times with an atmospheric plasma under the same conditions.

Figure 2:
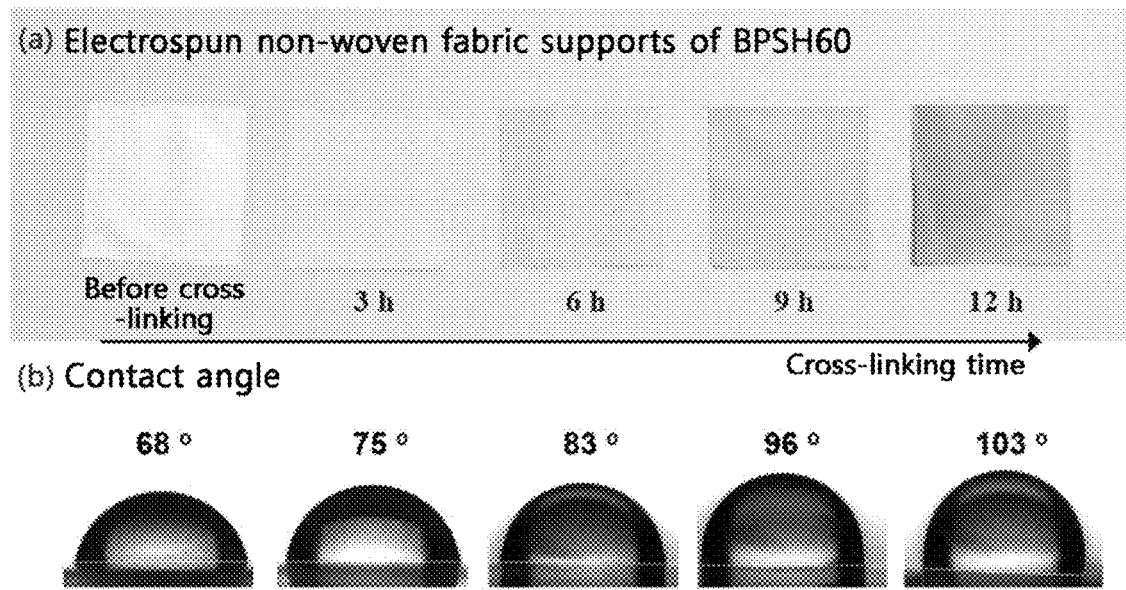
FIG. 2. (a) images of electrospun membranes fabricated by thermal cross-linking for different times in Example 1 and (b) contact angles of the electrospun membranes.

Electrospun membranes were fabricated in the same manner as in Example 1, except that the thermal cross-linking time was changed. FIG. 2 shows (a) images and (b) contact angles of the electrospun membranes. As the cross-linking time increased, the color of the electrospun membrane (support) was changed to brown and the contact angle of the electrospun membrane increased, demonstrating that the electrospun membrane became hydrophobic.

Figure 3:
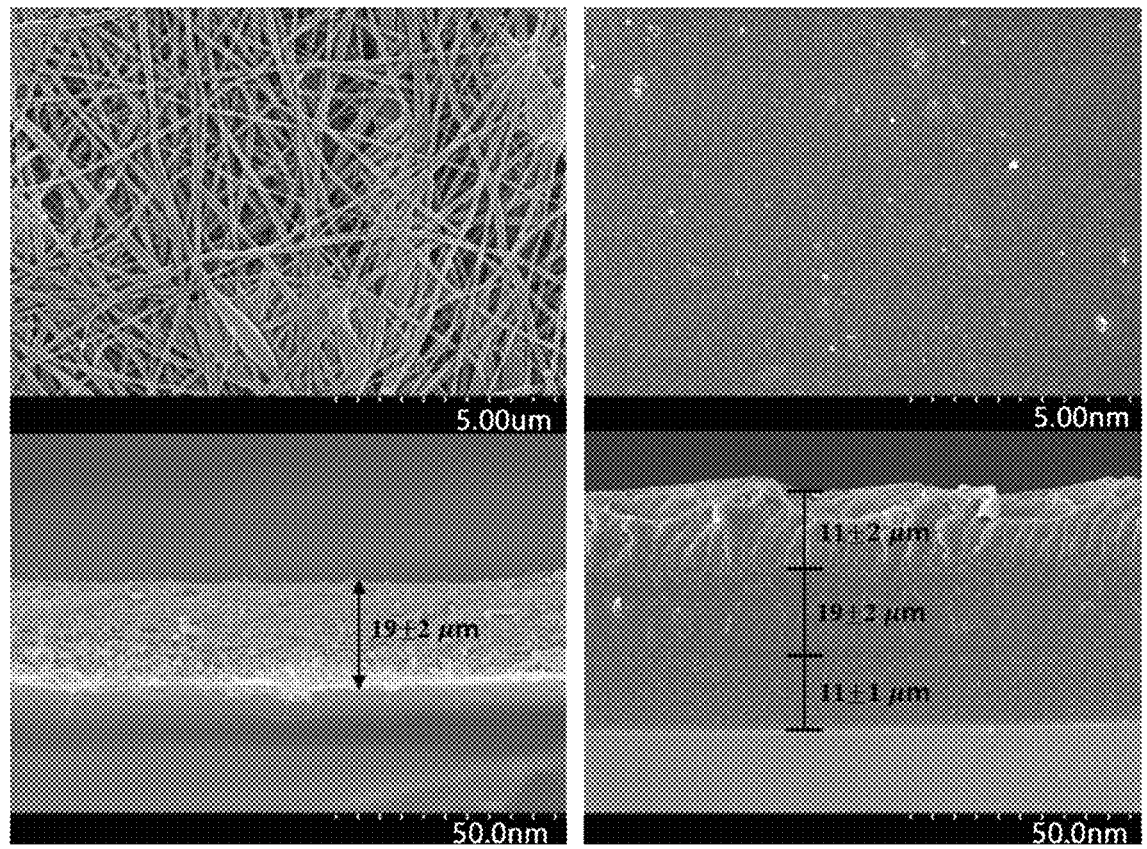
FIG. 3. Surface and cross-sectional scanning electron microscopy (SEM) images of (a) a cross-linked porous sulfonated polyarylene ether sulfone copolymer (Formula Ib) electrospun membrane produced in Example 1 and (b) an ion-exchange membrane formed on the surface of the electrospun membrane in Example 1.

Surface and cross-sectional scanning electron microscopy (SEM) images of the cross-linked porous sulfonated polyarylene ether sulfone copolymer (Formula Ib) electrospun membrane produced in Example 1 and the ion-exchange membrane formed on the surface of the electrospun membrane are shown in (a) and (b) of FIG. 3, respectively. The SEM images reveal that the ion-exchange membrane was uniformly formed on the surface of the cross-linked porous sulfonated polyarylene ether sulfone copolymer electrospun membrane.

Figure 4:
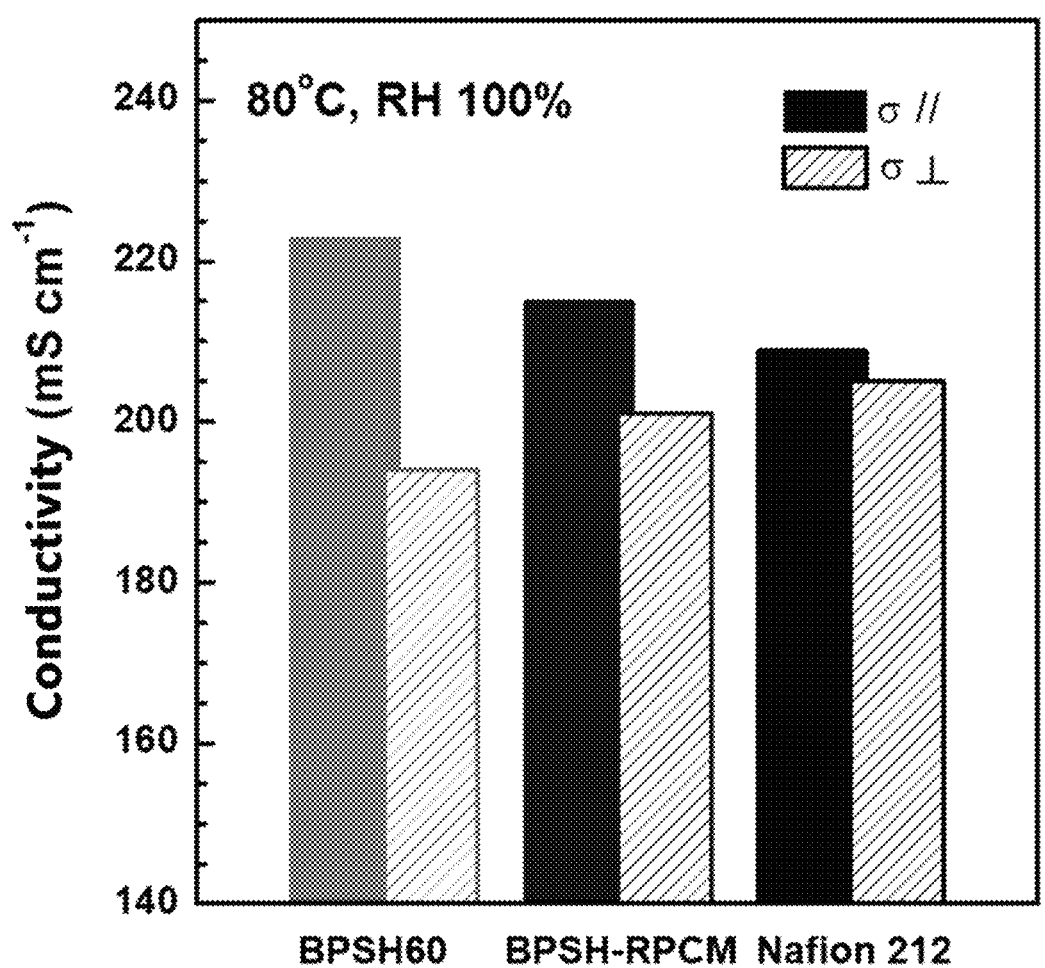
FIG. 4. Proton conductivities of an electrospun membrane (BPSH60) produced in Example 1, an ion-exchange membrane (BPSH-RPCM) formed on the surface of a cross-linked electrospun membrane (cross-linked BPSH60) in Example 1, and a Nafion 212 membrane.

FIG. 4 compares the proton conductivities of the electrospun membrane (BPSH60) produced in Example 1, the ion-exchange membrane (BPSH-RPCM) formed on the surface of the cross-linked electrospun membrane (cross-linked BPSH60) in Example 1, and a Nafion 212 membrane. Referring to FIG. 4, the electrospun membrane (BPSH60) and the ion-exchange membrane (BPSH-RPCM) formed on the surface of the cross-linked electrospun membrane (cross-linked BPSH60) showed improved proton conductivities in the thickness direction compared to the Nafion 212 membrane.

Figure 5:
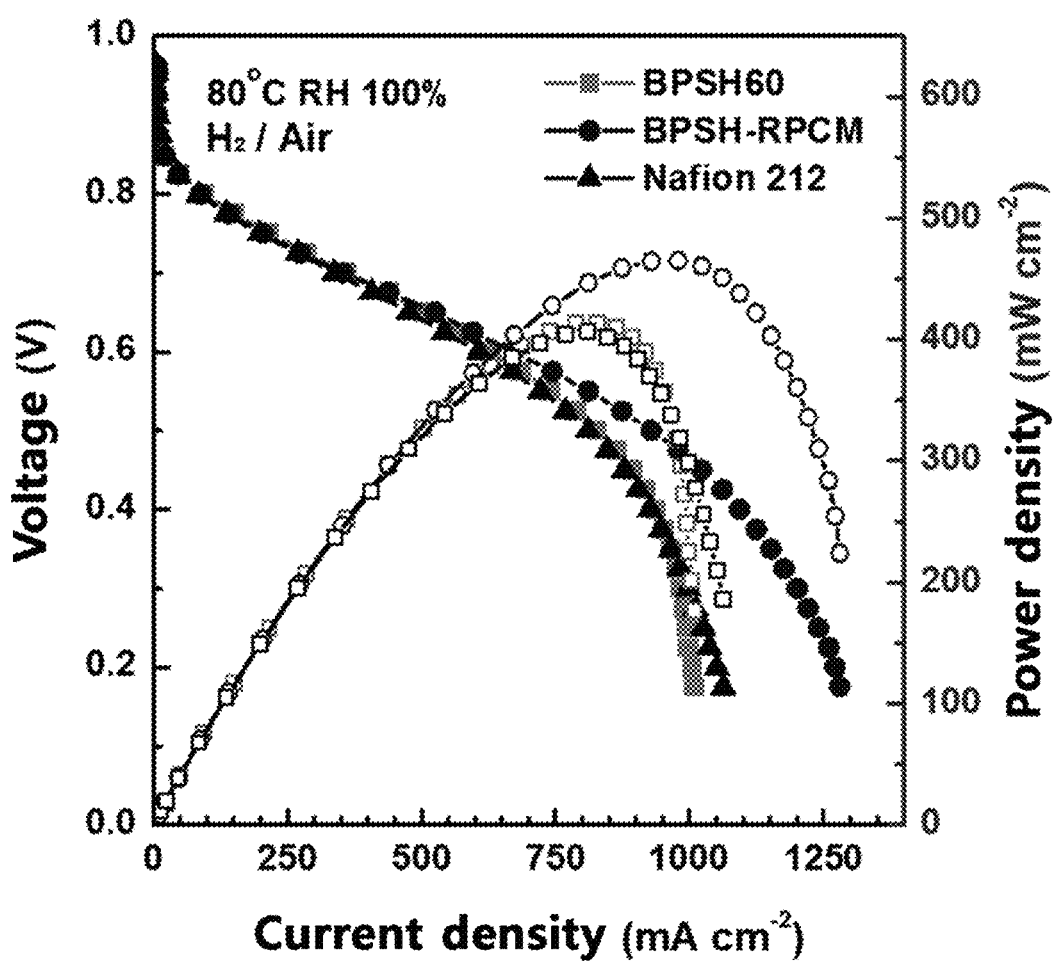
FIG. 5. Unit cell performances of an electrospun membrane (BPSH60) produced in Example 1, an ion-exchange membrane (BPSH-RPCM) formed on the surface of a cross-linked electrospun membrane (cross-linked BPSH60) in Example 1, and a Nafion 212 membrane.

FIG. 5 compares the unit cell performances of the electrospun membrane (BPSH60) produced in Example 1, the ion-exchange membrane (BPSH-RPCM) formed on the surface of the cross-linked electrospun membrane (cross-linked BPSH60) in Example 1, and a Nafion 212 membrane. Referring to FIG. 5, the unit cell performance of the ion-exchange membrane (BPSH-RPCM) formed on the surface of the cross-linked electrospun membrane (cross-linked BPSH60) was markedly improved compared to the unit cell performances of the electrospun membrane (cross-linked BPSH60) and the Nafion 212 membrane.

Figure 6:
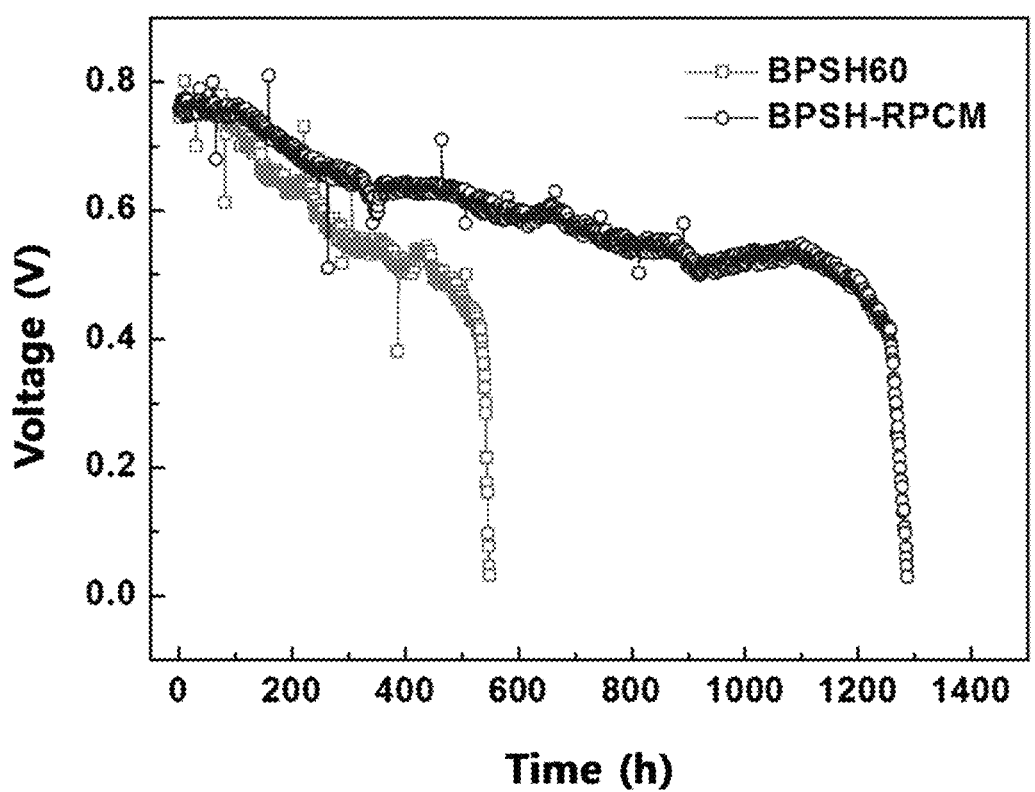
FIG. 6. Durability of an electrospun membrane (BPSH60) produced in Example 1 and durability of an ion-exchange membrane (BPSH-RPCM) formed on the surface of a cross-linked electrospun membrane (cross-linked BPSH60) in Example 1.

FIG. 6 compares the durability of the electrospun membrane (BPSH60) produced in Example 1 with that of the ion-exchange membrane (BPSH-RPCM) formed on the surface of the cross-linked electrospun membrane (cross-linked BPSH60) in Example 1. Referring to FIG. 6, the ion-exchange membrane (BPSH-RPCM) formed on the surface of the cross-link electrospun membrane (cross-linked BPSH60) showed a 2.5-fold increase in operating time compared to the electrospun membrane (BPSH60), indicating better durability of the ion-exchange membrane (BPSH-RPCM).

Figure 7:
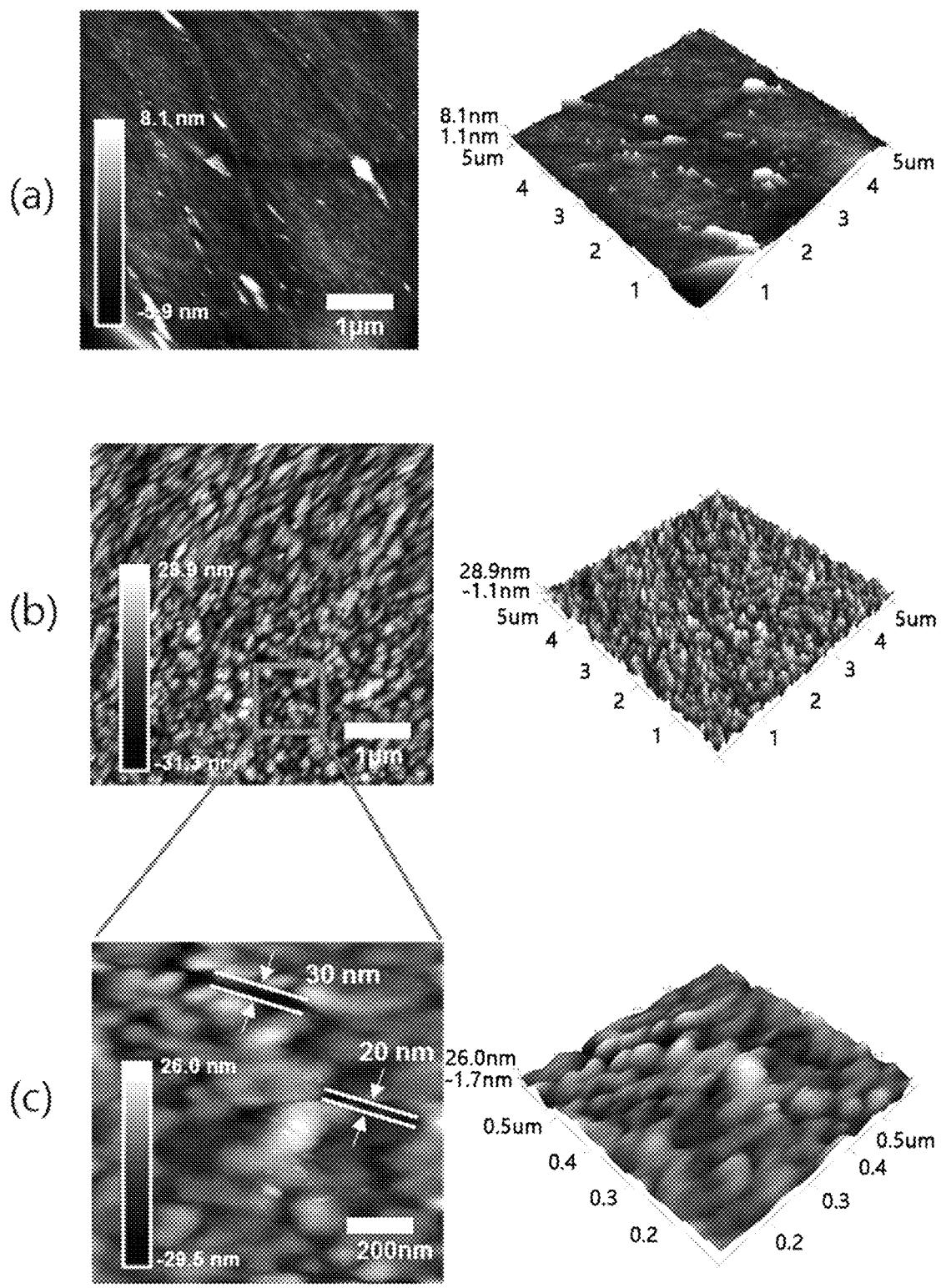
FIGS. 7. (a) and (b) surface atomic force microscopy (AFM) images of an ion-exchange membrane (BPSH-RPCM) before atmospheric plasma treatment and a self-humidifying ion-exchange composite membrane (P-BPSH-RPCM) after atmospheric plasma treatment in Example 1, respectively, and (c) a higher magnification image of the AFM image (b).

FIG. 7 shows (a) and (b) surface atomic force microscopy (AFM) images of the ion-exchange membrane (BPSH-RPCM) before the atmospheric plasma treatment and the self-humidifying ion-exchange composite membrane (P-BPSH-RPCM) after the atmospheric plasma treatment in Example 1, respectively, and (c) a higher magnification image of the AFM image (b). The higher magnification image (c) shows a nanocracked morphology pattern. In addition, the roughness of the composite membrane (P-BPSH-RPCM) was much higher than that of the monolayer membrane, supporting the formation of nanocracks on the surface of the self-humidifying ion-exchange composite membrane (P-BPSH-RPCM). The same results were obtained in the self-humidifying ion-exchange composite membrane (P-PET RCM R20) fabricated in Example 2.

Figure 8:
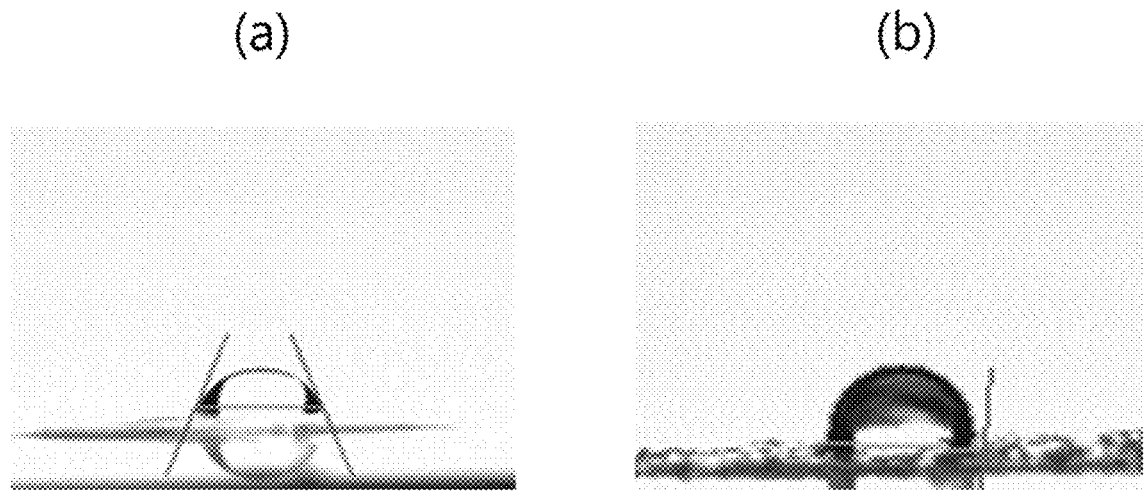
FIGS. 8. (a) and (b) contact angles of an ion-exchange membrane (PET RCM) before atmospheric plasma treatment and a self-humidifying ion-exchange composite membrane (P-PET RCM R20) after atmospheric plasma treatment in Example 2, respectively.

FIG. 8 shows (a) and (b) contact angles of the ion-exchange membrane (PET RCM) before the atmospheric plasma treatment and the self-humidifying ion-exchange composite membrane (P-PET RCM R20) after the atmospheric plasma treatment in Example 2, respectively. Referring to FIG. 8, the contact angle was 66.5° before the atmospheric plasma treatment and increased to 91.1° after the atmospheric plasma treatment, demonstrating the formation of a thin hydrophobic coating layer.

Figure 9:
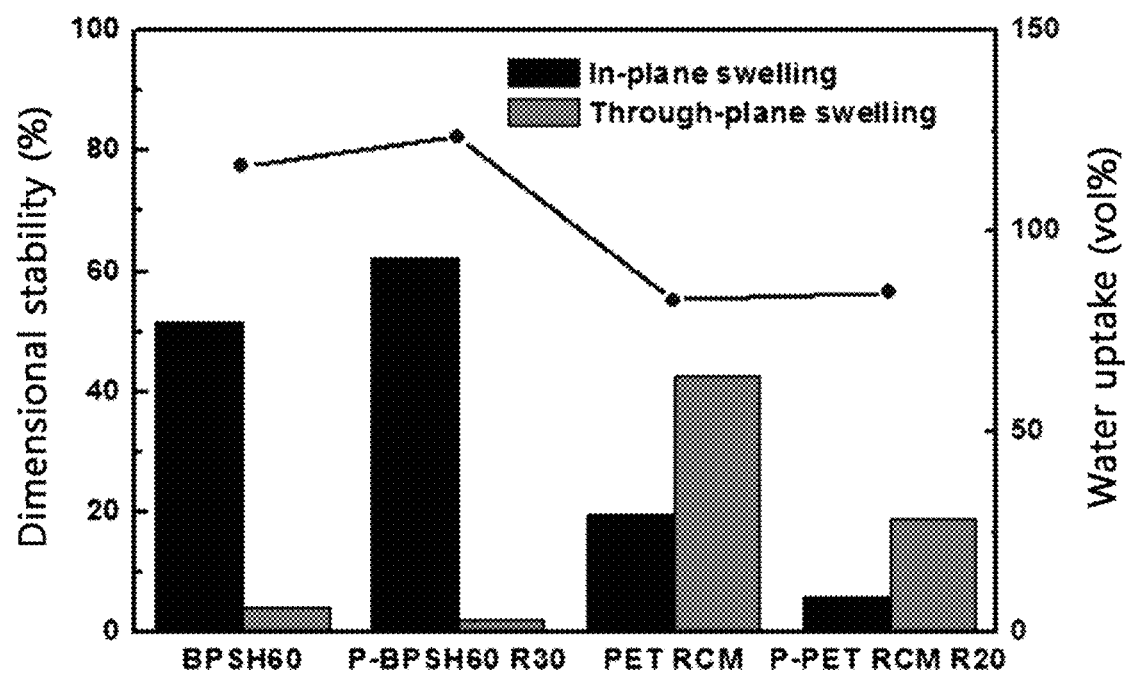
FIG. 9. Dimensional stabilities of a self-humidifying ion-exchange composite membrane (P-PET RCM R20) fabricated in Example 2 and BPSH60, P-BPSH60 R30, and PET RCM for comparison depending on their degree of swelling and water sorption behavior.

FIG. 9 compares the dimensional stability of the self-humidifying ion-exchange composite membrane (P-PET RCM R20) fabricated in Example 2 with those of BPSH60, P-BPSH60 R30, and PET RCM depending on their degrees of swelling and water sorption behavior. As shown in FIG. 9, the water uptake (vol %) of the composite membrane was lower than those of the monolayer membranes due to the influence of the support but was slightly increased after the atmospheric plasma treatment.

Fuel cells were manufactured using the monolayer membranes and the composite membrane (PET RCM) as polymer electrolyte membranes. When the fuel cells manufactured using the monolayer membranes were operated, physical failure was caused due to high in-plane swelling ratios of the monolayer membranes (50-60% for the monolayer membrane BPSH60), limiting their commercialization. The in-plane swelling ratio is indicative of the degree of swelling. However, the in-plane swelling ratio of the composite membrane (PET RCM) fabricated in Example 2 was as low as ~20% and was significantly reduced to ≤~6% by the atmospheric plasma treatment, as can be seen from FIG. 9. Thus, it is expected that the composite membrane (PET RCM) will be commercialized.

Table 1 compares the proton conductivities of the self-humidifying ion-exchange composite membrane (P-PET RCM R20) fabricated in Example 2 with those of BPSH60 (monolayer membrane), P-BPSH60 R30 (the monolayer membrane treated 30 times with atmospheric plasma) and PET RCM (the composite membrane untreated with atmospheric plasma in Example 2), which were measured at different temperatures (° C.) and relative humidities (% RH).

TABLE 1

| | Proton conductivities (S/cm) | | |
| --- | --- | --- | --- |
| Sample | 80° C./ 100% RH | 100° C./ 85% RH | 120° C./ 35% RH |
| BPSH60 | 0.177 ± 0.01 | 0.167 ± 0.01 | 0.018 ± 0.025 |
| P-BPSH60 R30 | 0.191 | 0.179 | 0.011 |
| PET RCM | 0.164 ± 0.03 | 0.153 ± 0.03 | 0.014 ± 0.005 |
| P-PET RCM R20 | 0.174 ± 0.02 | 0.153 ± 0.03 | 0.017 ± 0.003 |

As can be seen from the results in Table 1, the proton conductivities of the plasma-untreated composite membrane were rather lower than those of the monolayer membranes but the proton conductivities of the plasma-treated composite membrane were comparable to those of the monolayer membranes. Particularly, the proton conductivity of the self-humidifying ion-exchange composite membrane (P-PET RCM R20) fabricated in Example 2 under high-temperature and low-humidity conditions (120° C./35% RH) was comparable to that of the monolayer membrane (BPSH60). Therefore, the fuel cell manufactured using the composite membrane (P-PET RCM R20) as a polymer electrolyte membrane can be operated under high-temperature and low-humidity conditions, suggesting that the composite membrane (P-PET RCM R20) can be commercialized.

Figure 10:
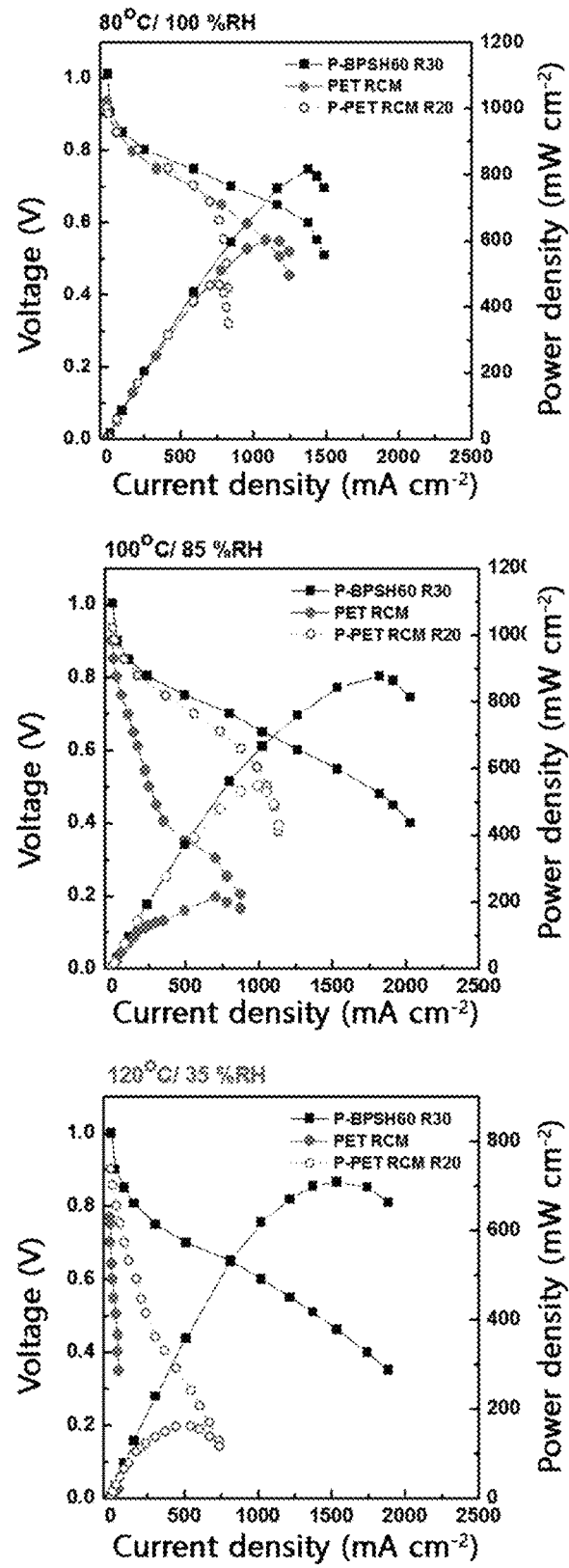
FIG. 10. Current densities and power densities of a self-humidifying ion-exchange composite membrane (P-PET RCM R20) fabricated in Example 2 and P-BPSH60 R30 and PET RCM for comparison, which were measured under different temperature (° C.) and relative humidity (% RH) conditions (80° C./100% RH, 100° C./85% RH, and 120° C./35% RH).

FIG. 10 compares the current densities and power densities of the self-humidifying ion-exchange composite membrane (P-PET RCM R20) fabricated in Example 2 with those of P-BPSH60 R30 and PET RCM, which were measured under different temperature (° C.) and relative humidity (% RH) conditions (80° C./100% RH, 100° C./85% RH, and 120° C./35% RH). As shown in FIG. 10, the current densities and power densities of the composite membrane (PET RCM) versus the maximum power of a general fuel cell (0.6 V) under the three different temperature and relative humidity conditions were low compared to those of the plasma-treated monolayer membrane (P-BPSH60 R30) due to the influence of the support. However, the performances of the plasma-treated ion-exchange composite membrane P-PET RCM R20 were rather low under relatively low temperature and high humidity (80° C./100% RH) conditions compared to those of the plasma-untreated composite membrane PET RCM. However, the current density and power density of the ion-exchange composite membrane P-PET RCM R20 increased with increasing temperature (80° C.→100° C.→120° C.) and decreasing humidity (100% RH→35% RH).

INDUSTRIAL APPLICABILITY

As is apparent from the foregoing, the self-humidifying ion-exchange composite membrane of the present invention has good thermal/chemical stability, high mechanical strength, high ion-exchange capacity, and good long-term operational stability. Particularly, the self-humidifying ion-exchange composite membrane of the present invention is able to self-hydrate even under high-temperature and low-humidity conditions (120° C./35% RH). Due to these advantages, it is expected that the self-humidifying ion-exchange composite membrane of the present invention will be commercialized as an electrolyte membrane for a fuel cell or a membrane for water treatment.

The invention claimed is:
1. A self-humidifying ion-exchange composite membrane comprising
   a) polyarylene ether sulfone copolymer having a cross-linked repeating unit of Formula 2 as a porous polymer support,
   b) an aromatic hydrocarbon polymer ion-exchange membrane formed on the surface of the support, and
   c) a thin hydrophobic coating layer having a nanocracked morphology pattern on the surface of the ion-exchange membrane,

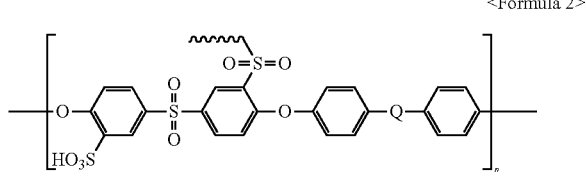

<Formula 2>

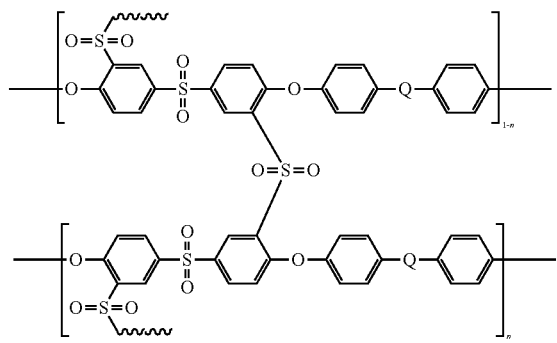

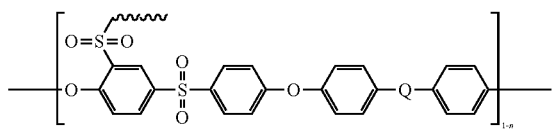

wherein each Q is a single bond, O, S, C(=O), C(=O)NH, Si(CH$_3$)$_2$, (CH$_2$)p (1≤p≤10), (CF$_2$)$_q$ (1≤q≤10), C(CH$_3$)$_2$, C(CF$_3$)$_2$ or C(CH$_3$)(CF$_3$) and n representing the molar ratio of the corresponding structural units satisfies 0<n<1.

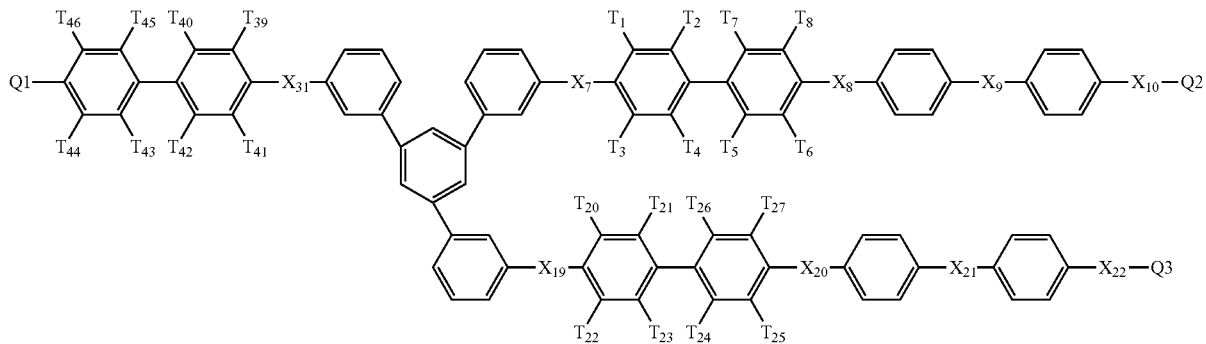

2. The self-humidifying ion-exchange composite membrane according to claim 1, wherein the porous polymer support is an electrospun film or non-woven fabric.

3. The self-humidifying ion-exchange composite membrane according to claim 1, wherein the aromatic hydrocarbon polymer is selected from the group consisting of polybenzimidazole, polybenzoxazole, polyimide, polyetherimide, polyphenylene sulfide, polysulfone, polyethersulfone, polyetherketone, polyetheretherketone, polyphenylquinoxaline, a copolymer thereof, and a combination thereof.

4. The self-humidifying ion-exchange composite membrane according to claim 1, wherein the aromatic hydrocarbon polymer ion-exchange membrane comprises: an aromatic hydrocarbon polymer comprising a first repeating unit of Formula 3:

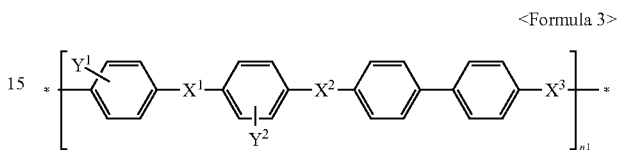

<Formula 3> wherein $X^1$, $X^2$, and $X^3$ are identical to or different from each other and are each independently SO$_2$ or O, $Y_1$ and $Y_2$ are each independently SO$_3$H or SO$_3$Na, and n1 is an integer from 30 to 70, and a second repeating unit of Formula 4:

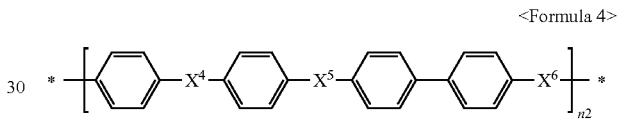

<Formula 4> wherein $X^4$, $X^5$, and $X^6$ are identical to or different from each other and are each independently SO$_2$ or O, n2 is 100−n1, and n1 is an integer from 30 to 70; and/or an aromatic hydrocarbon polymer represented by Formula 5, 6 or 7:

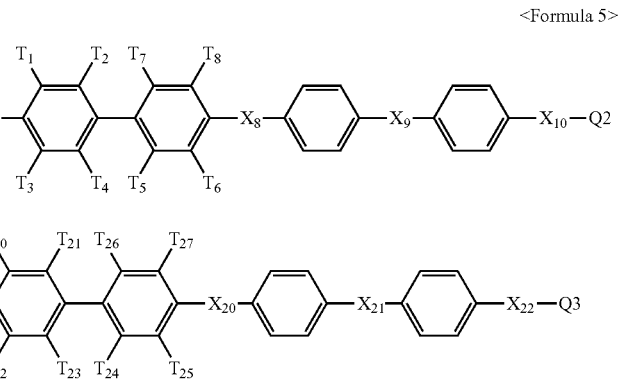

<Formula 5> wherein $X_7$, $X_8$, $X_9$, $X_{10}$, $X_{19}$, $X_{20}$, $X_{21}$, $X_{22}$, and $X_{31}$ are identical to or different from each other and are each independently sulfide (S), ether (O) or sulfone (SO$_2$), $T_1$, $T_2$, $T_3$, $T_4$, $T_5$, $T_6$, $T_7$, $T_8$, $T_{20}$, $T_{21}$, $T_{22}$, $T_{23}$, $T_{24}$, $T_{25}$, $T_{26}$, $T_{27}$, $T_{39}$, $T_{40}$, $T_{41}$, $T_{42}$, $T_{43}$, $T_{44}$, and $T_{45}$ are identical to or different from each other and are each independently fluoro (F), cyano (CN) or sulfo (SO$_3$H), Q1 is represented by Formula 5a:

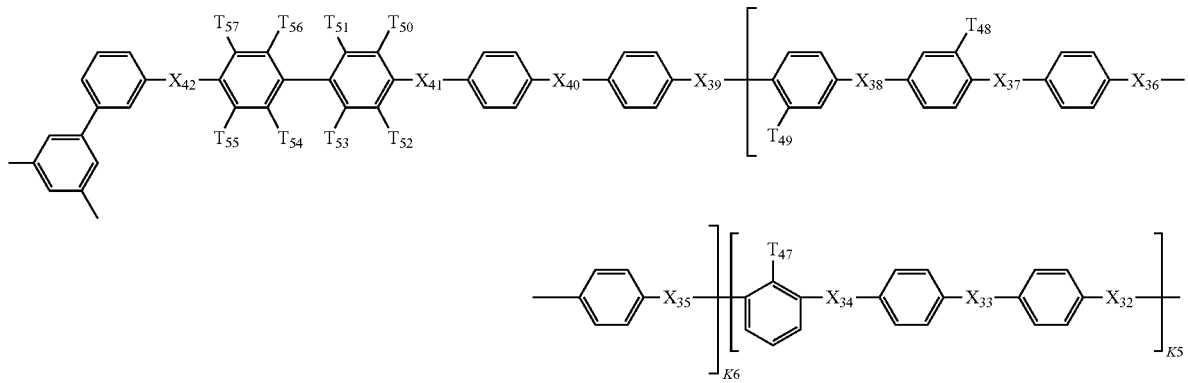
<Formula 5a> wherein $X_{32}$, $X_{33}$, $X_{34}$, $X_{35}$, $X_{36}$, $X_{37}$, $X_{39}$, $X_{40}$, $X_{41}$, and $X_{42}$ are identical to or different from each other and are each independently sulfide (S), ether (O) or sulfone ($SO_2$), $X_{38}$ is sulfone ($SO_2$), $T_{50}$, $T_{51}$, $T_{52}$, $T_{53}$, $T_{54}$, $T_{55}$, and $T_{57}$ are identical to or different from each other and are each independently fluoro (F), cyano (CN) or sulfo ($SO_3H$), each of $T_{48}$ and $T_{49}$ is sulfo ($SO_3H$), $T_{47}$ is cyano (CN), and k5 representing the mole fraction of the corresponding hydrophilic moiety is a real number from 0.4 to 0.6, and k6 representing the mole fraction of the corresponding hydrophobic moiety is a real number from 0.6 to 0.4 satisfying 1-k5, Q2 is represented by Formula 5b:

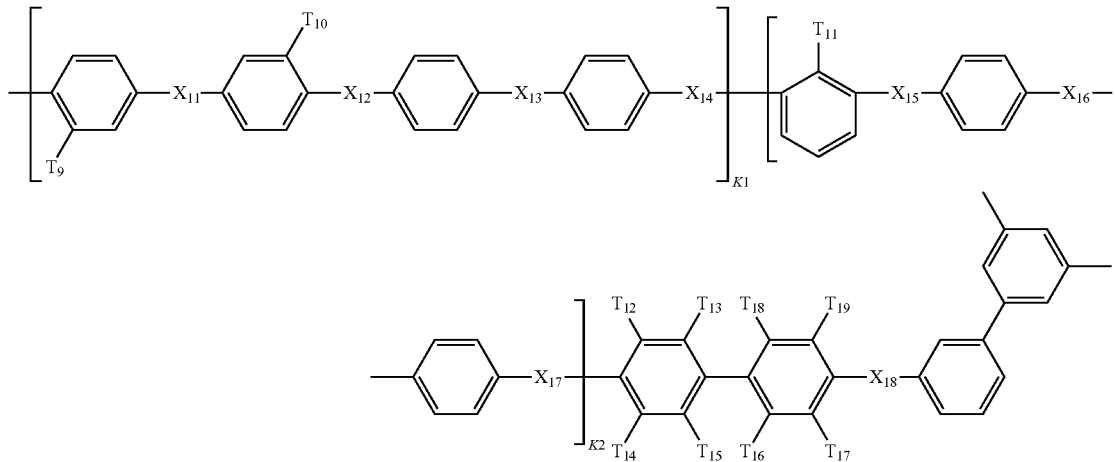
<Formula 5b> wherein $X_{12}$, $X_{13}$, $X_{14}$, $X_{15}$, $X_{16}$, $X_{17}$, and $X_{18}$ are identical to or different from each other and are each independently sulfide (S), ether (O) or sulfone ($SO_2$), $X_{11}$ is sulfone ($SO_2$), $T_{12}$, $T_{13}$, $T_{14}$, $T_{15}$, $T_{16}$, $T_{17}$, $T_{18}$, and $T_{19}$ are identical to or different from each other and are each independently fluoro (F), cyano (CN) or sulfo ($SO_3H$), each of $T_9$ and $T_{10}$ are sulfo ($SO_3H$), $T_{11}$ is cyano (CN), k1 representing the mole fraction of the corresponding hydrophilic moiety is a real number from 0.4 to 0.6, and k2 representing the mole fraction of the corresponding hydrophobic moiety is a real number from 0.6 to 0.4 satisfying 1-k1, and Q3 is represented by Formula 5c:

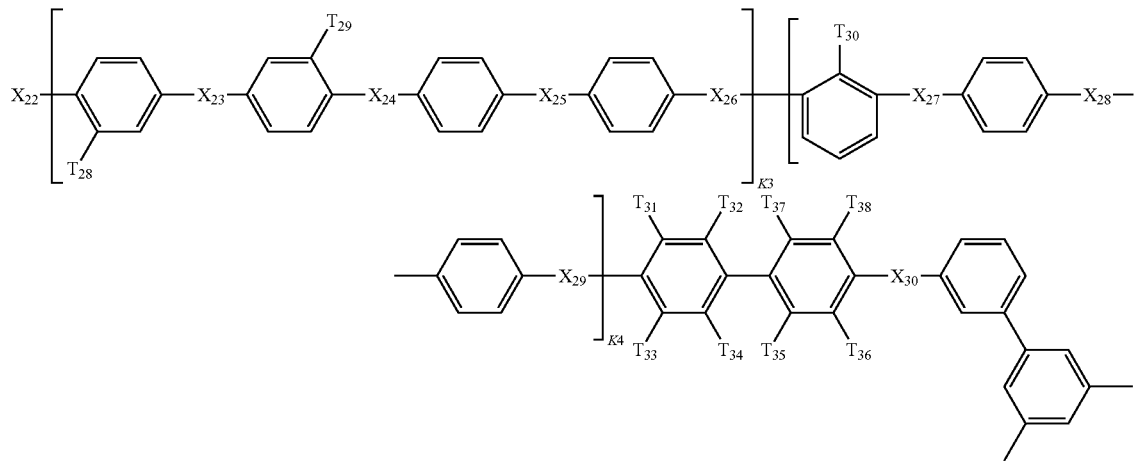

<Formula 5c> wherein $X_{22}$, $X_{24}$, $X_{25}$, $X_{26}$, $X_{27}$, $X_{28}$, $X_{29}$, and $X_{30}$ are identical to or different from each other and are each independently sulfide (S), ether (O) or sulfone ($SO_2$), $X_{23}$ is sulfone ($SO_2$), $T_{31}$, $T_{32}$, $T_{33}$, $T_{34}$, $T_{35}$, $T_{36}$, $T_{37}$, and $T_{38}$ are identical to or different from each other and are each independently fluoro (F), cyano (CN) or sulfo ($SO_3H$), $T_{28}$ and $T_{29}$ are each independently sulfo ($SO_3H$), $T_{30}$ is cyano (CN), k3 representing the mole fraction of the corresponding hydrophilic moiety is a real number from 0.4 to 0.6, and k4 representing the mole fraction of the corresponding hydrophobic moiety is a real number from 0.6 to 0.4 satisfying 1–k3, wherein each R is $CH_2N(CH_3)_3Cl$ and n is an integer from 30 to 70.

5. The self-humidifying ion-exchange composite membrane according to claim 1, wherein the thin hydrophobic coating layer comprises —$CF_2$—, —$CF_3$ or a combination thereof as a hydrophobic functional group.

6. The self-humidifying ion-exchange composite membrane according to claim 1, wherein the thin hydrophobic coating layer has a thickness of 10 to 1000 nm.

7. A method for fabricating the self-humidifying ion-exchange composite membrane according to claim 1, comprising

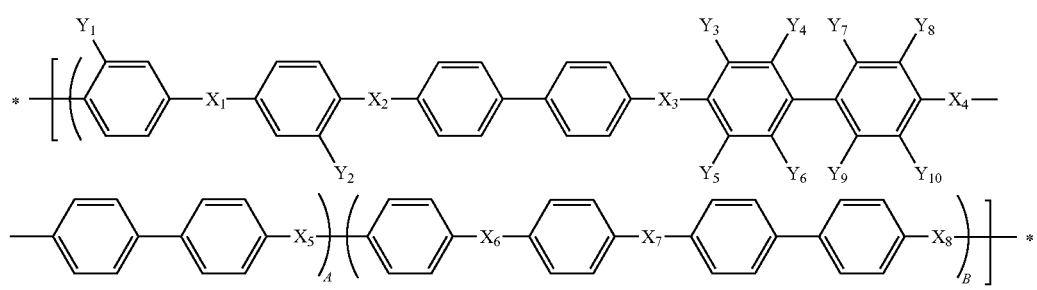

<Formula 6> wherein $X_1$, $X_2$, $X_3$, $X_4$, $X_5$, $X_6$, $X_7$, and $X_8$ are identical to or different from each other and are each independently $SO_2$ or O, $Y_1$ and $Y_2$ are each independently $SO_3H$ or $SO_3Na$, each of $Y_3$, $Y_4$, $Y_5$, $Y_6$, $Y_7$, $Y_8$, $Y_9$, and $Y_{10}$ is fluoro (F), A is an integer from 5 to 30, and B is an integer from 10 to 40, I) producing a polyarylene ether sulfone copolymer having a cross-linked repeating unit of Formula 2 as a porous polymer support, II) coating an aromatic hydrocarbon polymer on the surface of the support to form an ion-exchange membrane, and <Formula 7>

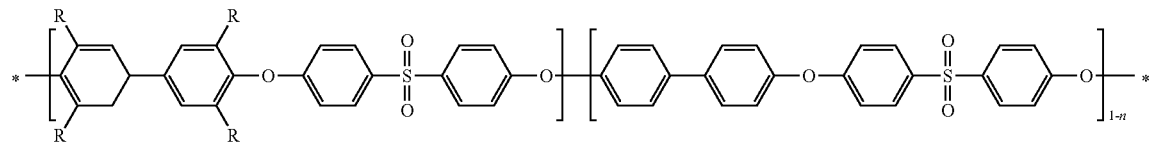

III) treating the ion-exchange membrane 3 to 40 times with an atmospheric plasma

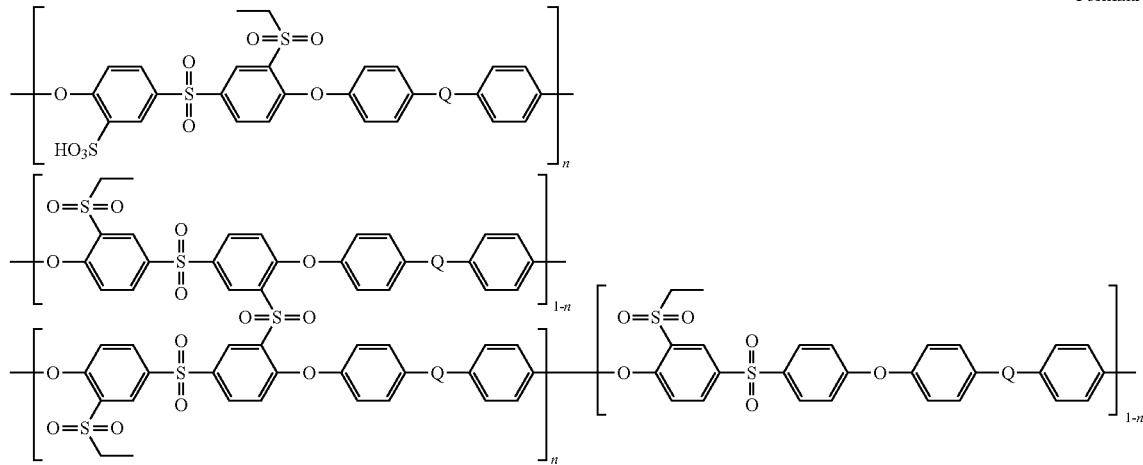

<Formula 2> wherein each Q is a single bond, O, S, C(=O), C(=O)NH, Si(CH$_3$)$_2$, (CH$_2$)p (1≤p≤10), (CF$_2$)$_q$ (1≤q≤10), C(CH$_3$)$_2$, C(CF$_3$)$_2$ or C(CH$_3$)(CF$_3$) and n representing the molar ratio of the corresponding structural units satisfies 0<n<1.

8. The method according to claim 7, wherein the coating is performed by immersing the porous polymer support in a solution of the aromatic hydrocarbon polymer.

9. The method according to claim 7, wherein the atmospheric plasma treatment is performed by blowing a first gas selected from argon gas, nitrogen gas, oxygen gas, helium gas, and a combination thereof and a second gas selected from a hydrocarbon gas, a fluorocarbon gas, and a combination thereof.

10. The method according to claim 9, wherein the hydrocarbon gas is CH$_4$ gas or C$_2$H$_2$ gas.

11. The method according to claim 9, wherein the fluorocarbon gas is C$_4$F$_8$ gas, CF$_4$ gas or a combination thereof.

12. A fuel cell comprising the self-humidifying ion-exchange composite membrane according to claim 1.

* * * * *